US012705237B2

(12) United States Patent
Lee et al.

(10) Patent No.: US 12,705,237 B2

(45) Date of Patent: Aug. 11, 2026

(54) QUERY LANGUAGE REPRESENTATIONS OF CONSTRAINTS USEABLE TO CAUSE QUERY FAILURE

(71) Applicant: SAP SE, Walldorf (DE)

(72) Inventors: Jin Su Lee, Seoul (KR); Jaehyok Chong, Seoul (KR)

(73) Assignee: SAP SE, Walldorf (DE)

( * ) Notice: Subject to any disclaimer, the term of this patent is extended or adjusted under 35 U.S.C. 154(b) by 53 days.

(21) Appl. No.: 18/734,562

(22) Filed: Jun. 5, 2024

(65) Prior Publication Data

US 2025/0378074 A1 Dec. 11, 2025

(51) Int. Cl.
*G06F 16/2453* (2019.01)

(52) U.S. Cl.
CPC .. *G06F 16/24534* (2019.01); *G06F 16/24532* (2019.01)

(58) Field of Classification Search
CPC ......... G06F 16/24534; G06F 16/24532; G06F 16/2471; G06F 16/256
See application file for complete search history.

(56) References Cited

U.S. PATENT DOCUMENTS 8,015,180 B2 * 9/2011 Hu ..................... G06F 16/2458 707/719
8,166,059 B2 * 4/2012 Krishnaprasad .. G06F 16/24547 707/769
2007/0027905 A1 * 2/2007 Warren ............... G06F 16/2452
2009/0006320 A1 * 1/2009 Ding ...................... G06Q 10/06
2013/0060803 A1 * 3/2013 Maman ............... G06F 16/2452 707/E17.014
2015/0149436 A1 * 5/2015 McKenna ........... G06F 16/2453 707/718
2017/0262498 A1 * 9/2017 Kennedy ............ G06F 16/2448

OTHER PUBLICATIONS

Alotaibi et al., "Towards Scalable Hybrid Stores: Constraint-Based Rewriting to the Rescue," SIGMOD '19, Jun. 30-Jul. 5, 2019, Amsterdam, Netherlands, 18 pages.
Extended European Search Report received in European Application No. 25180616.2, Oct. 16, 2025, 11 pages.

* cited by examiner

*Primary Examiner* — Ann J Lo
(74) *Attorney, Agent, or Firm* — Klarquist Sparkman, LLP

(57) ABSTRACT

Techniques and solutions are provided for implementing query constraints. A keyword in a query language is provided that indicates the presence of a constraint. During query execution, if the constraint is not satisfied, the query can be terminated/caused to fail. In some cases, the keyword is introduced into a query by a query optimizer. In a specific example, the keyword is introduced as part of optimizing a query where at least some query operations are performed using a federated database system. The keyword indicating the constraint can be included in a query language statement and sent to the federated database system for execution. If the constraint is not satisfied, the federated database system can send a failure notification to the main database system.

20 Claims, 18 Drawing Sheets

At a first database system, receive or generate a first query comprising one or more query operations, a first query operation of the one or more query operations being a keyword in a query language that expresses a constraint, where a query is failed during query execution if the constraint is not satisfied 1354

↓

Cause the first query to be executed 1358

↓

During execution of the first query, determine that the constraint is not satisfied 1362

↓

Based on determining that the constraint is not satisfied, cause the first query to fail 1366

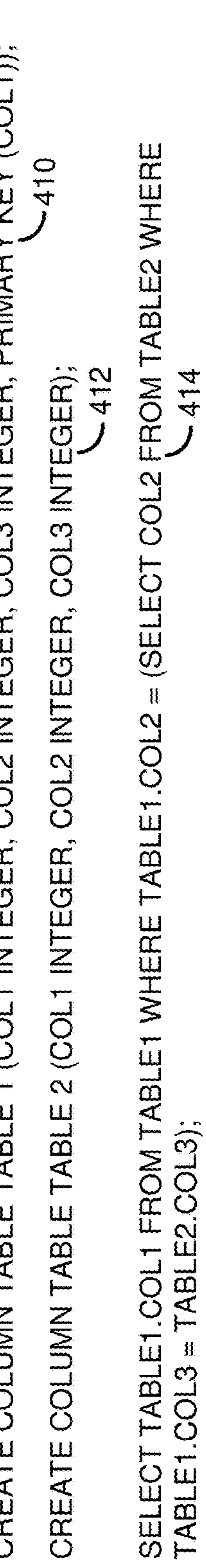
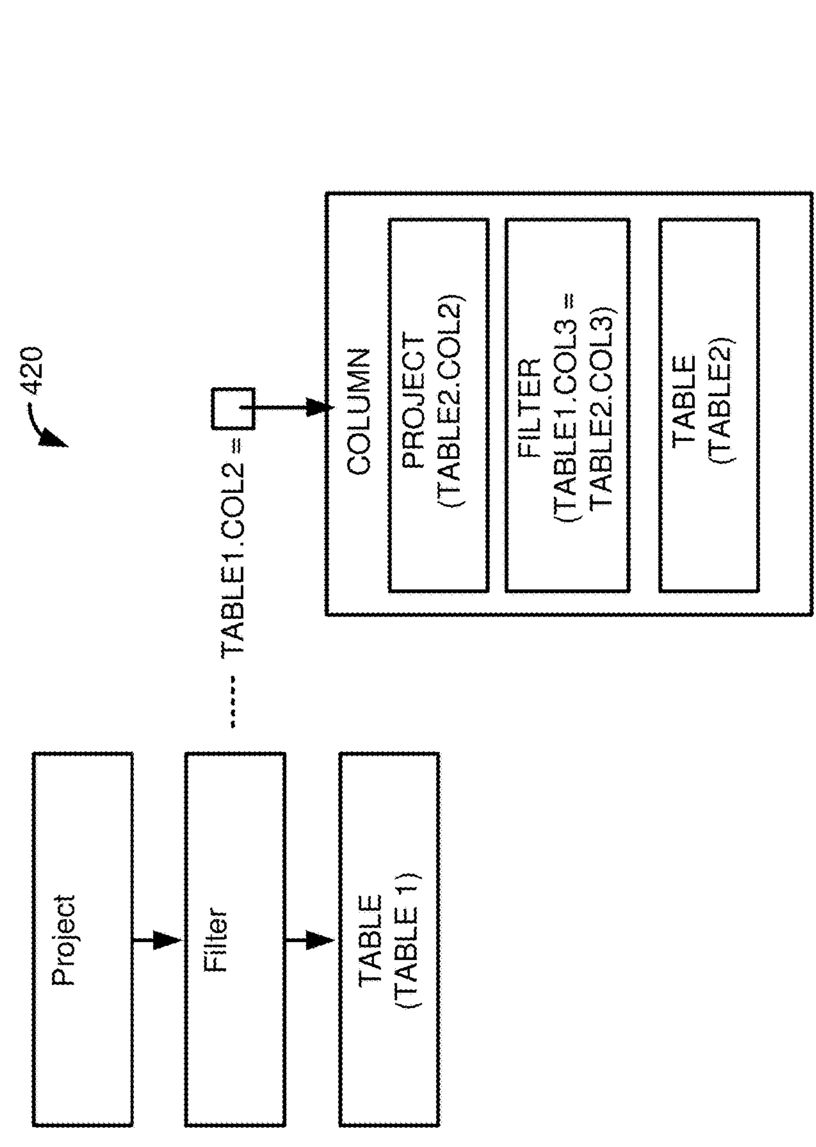
FIG. 4

600

| Step | Operation | Object | Access Type | Cost | Constraint |
|---|---|---|---|---|---|
| 1 | Table Scan | TABLE1, TABLE2 | Table Scan, Table Scan | 50 | t1.COL3 = t2.COL3 |
| 2 | Filter | TABLE1, TABLE2 | Predicate | 20 | |
| 3 | Nested Loop Join | TABLE1, TABLE2 | | 100 | |
| 4 | Hash Aggregate | TABLE1 | Group By | 50 | t1.COL1 |

```
def filter_constraint(table1, table2):
    """
    Apply filter constraint to TABLE1 and TABLE2.

    Args:
    - table1 (DataFrame): DataFrame representing TABLE1.
    - table2 (DataFrame): DataFrame representing TABLE2.

    Returns:
    - filtered_data (DataFrame): DataFrame containing rows satisfying the filter constraint.
    """
    # Apply the filter constraint t1.COL3 = t2.COL3
    filtered_data = table1[table1['COL3'].isin(table2['COL3'])]

    return filtered_data
```

920

```
def group_by_constraint(table1):
    """
    Apply group by constraint to TABLE1.

    Args:
    - table1 (DataFrame): DataFrame representing TABLE1.

    Returns:
    - grouped_data (DataFrame): DataFrame containing aggregated data grouped by COL1.
    """
    # Apply the group by constraint on COL1 and aggregate the data
    grouped_data = table1.groupby('COL1').agg({'COL1': 'first', 'COL2': 'sum'})  # Example aggregation function (e.g., SUM)

    return grouped_data
```

FIG. 9

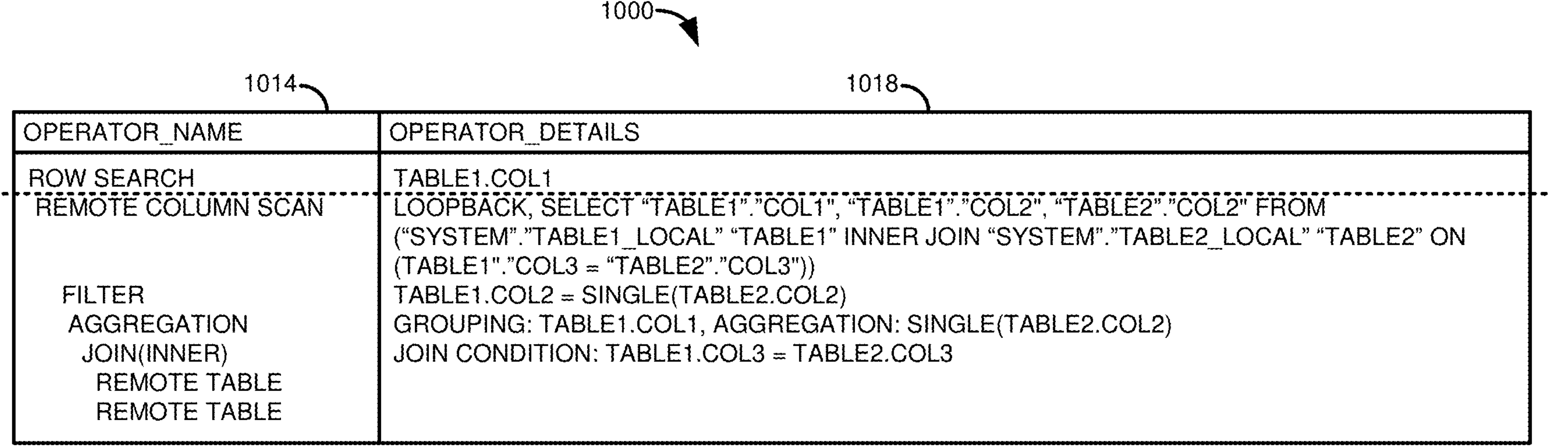

1000

1014, 1018

| OPERATOR_NAME | OPERATOR_DETAILS |
| --- | --- |
| ROW SEARCH | TABLE1.COL1 |
| REMOTE COLUMN SCAN | LOOPBACK, SELECT "TABLE1"."COL1", "TABLE1"."COL2", "TABLE2"."COL2" FROM ("SYSTEM"."TABLE1_LOCAL" "TABLE1" INNER JOIN "SYSTEM"."TABLE2_LOCAL" "TABLE2" ON (TABLE1"."COL3 = "TABLE2"."COL3")) |
| FILTER | TABLE1.COL2 = SINGLE(TABLE2.COL2) |
| AGGREGATION | GROUPING: TABLE1.COL1, AGGREGATION: SINGLE(TABLE2.COL2) |
| JOIN(INNER) | JOIN CONDITION: TABLE1.COL3 = TABLE2.COL3 |
| REMOTE TABLE | |
| REMOTE TABLE | |

At a first database system, receive a first query that includes a first plurality of query operations 1304

Rewrite the first query to provide a second query, the second query including a second plurality of query operations, the second plurality of query operations including one or more query operations that are different than the first plurality of query operations of the first query, a first query operation of the one or more query operations being a keyword in a query language expressing a constraint, where, during query execution, when the constraint is not satisfied, the query fails 1308

At a federated database system, receiving a first plurality of query operations from a source database system, the first plurality of query operations including a first query operation expressing a constraint, the first query operation being a keyword of a query language, wherein, during query execution of the first plurality of query operations at the federated database system, when the constraint is not satisfied, a query comprising the first plurality of query operations fails 1334

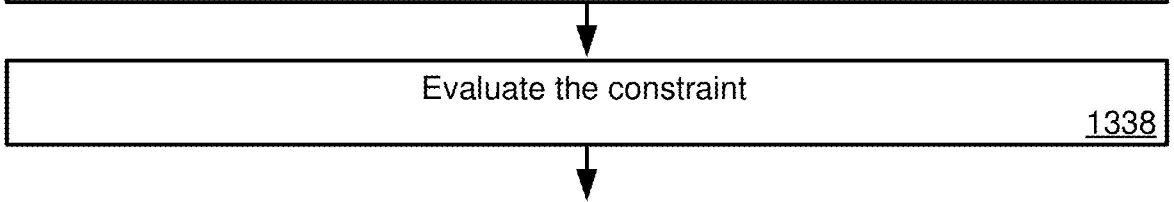

Provide an execution result to the source database system from executing at least a portion of the first plurality of query operations 1342

FIG. 13B

QUERY LANGUAGE REPRESENTATIONS OF CONSTRAINTS USEABLE TO CAUSE QUERY FAILURE

FIELD

The present disclosure generally relates to query processing. Particular embodiments relate to query language representations of constraints where, if a constraint is not satisfied, query execution fails.

BACKGROUND

It is increasingly common for enterprises to have data stored in a variety of systems, including in one or more local (or "on-premise") systems (which may or may not be in physical proximity), in one or more cloud-based systems, or in a combination of local and cloud-based systems. The systems can be of different types-such as storing data in different formats (e.g., a relational database versus a database that stores JSON documents) or storing data using different database management systems (e.g., using software and/or hardware provided by different vendors). Even where data is stored in the same format and using software of the same vendor, differences can exist in what data is stored at a particular location and the schema used to store it.

In order to help address these issues, database federation techniques have been used. In a federated database environment, requests for database operations, such as queries, can specify sources at a local database system or at a "remote" database accessed using data federation. Unlike traditional distributed databases where data is physically replicated across multiple nodes, federated databases allow for virtual integration of data from disparate sources without the need for data replication.

Communication between different databases in a federated environment typically occurs through specialized adapters or APIs that facilitate data access and query execution. These adapters or APIs act as intermediaries between the "source" database system and federated systems, translating requests and responses between the federated system's query language (such as SQL) and the native query languages or protocols supported by the data sources. The "source" database system, also known as the primary database system, refers to the system that receives a query from a client and is primarily responsible for query execution, including communicating with any federated systems referenced by the query.

When a query is executed in a source database system, the query optimizer of the source database system determines the optimal execution plan. While the optimizer primarily generates SQL statements for traditional database systems, in a federated environment, it may generate federated query plans or optimization directives. These plans or directives provide instructions for accessing and processing data from the individual data sources, ensuring efficient query execution across the federated environment.

The data transferred between the source database system and the federated systems typically includes query requests, intermediate results, and final result sets. Query requests contain the necessary information for retrieving the required data, such as select conditions, join criteria, and aggregation functions. Intermediate results may be transferred between federated systems and the source database system during distributed query processing to optimize performance and reduce data transfer overhead. Finally, the final result set, containing the merged and aggregated data from all relevant federated sources, is returned to the source database system for presentation to the user or application.

In summary, federated database systems employ specialized adapters or APIs to facilitate communication between different data sources, enabling seamless integration of data from disparate sources without the need for physical data replication. Query requests and results are transferred between the source system and federated systems using standardized protocols, with data access commands typically being SQL statements or their equivalents. This approach ensures data autonomy and sovereignty by allowing each data source to retain control over its data assets while enabling collaboration and data integration across the federated environment.

Operations with remote data can, in some cases, can be performed on the remote system, while in other cases the operations are performed on a source system, and a query optimizer can choose between different plans where operations are performed on different systems. The location where the operations are performed can impact query execution time and computing resource use. For example, if a filter operation or join can be performed on a remote (federated) system, less data may need to be transferred from the remote system to the source system than if a larger set of data were transferred to the source system and the filter/join performed on the local system. However, in some cases a query may have operations that block sending a larger subset of the query operations to a remote system. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are provided for implementing query constraints. A keyword in a query language is provided that indicates the presence of a constraint. During query execution, if the constraint is not satisfied, the query can be terminated/caused to fail. In some cases, the keyword is introduced into a query by a query optimizer. In a specific example, the keyword is introduced as part of optimizing a query where at least some query operations are performed using a federated database system. The keyword indicating the constraint can be included in a query language statement and sent to the federated database system for execution. If the constraint is not satisfied, the federated database system can send a failure notification to the main database system.

In one aspect, the present disclosure provides a process for rewriting a query to include a constraint. A first query is received at a first database system. The first query includes a first plurality of query operations. The first query is rewritten to provide a second query. The second query includes one or more query operations that are different than that first plurality of query operations of the first query. A first query operation of the one or more query operations is a keyword in a query language and expresses a constraint. During query execution, the query fails if the constraint is not satisfied.

In another aspect, the present disclosure provides a process for executing a query at a federated database. At the federated database system, a first plurality of query operations are received from a source database system. The first plurality of query operations includes a first query operation that includes a keyword of a query languages and expresses a constraint. During execution of the first plurality of query operations at the federated database system, a query comprising the first query operations fails if the constraint is not satisfied. The constraint is evaluated. Execution results from executing at least a portion of the first plurality of query operations are returned to the source database system.

In a further aspect, the present disclosure provides a process for executing a query that includes a constraint. A first query is received or generated by a first database system. The first query includes one or more query operations, with a first query operation being a keyword in a query language that expresses a constraint. If the constraint is not satisfied during query execution, the query fails. The first query is caused to be executed. During execution of the first query, it is determined that the constraint is not satisfied. The first query to is caused to fail based on this determination.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 4 provides data definition language statements defining two tables and a SQL statement the performs a scalar subquery on the tables, as well as a diagram of operations to be performed in executing the SQL statement.

FIG. 6 illustrates a query plan for the rewritten SQL statement of FIG. 5, where the query plan includes constraints that result in the SQL statement performing more analogously to the original scalar subquery, such as having the query fail if a uniqueness constraint is not satisfied.

FIG. 9 provides example code that can be used to implement the constraints of FIG. 8.

FIG. 10 is a table providing an explanation of operations in executing the query of FIG. 8.

FIG. 13A is a flowchart that illustrates example operations for a process of rewriting a query to include a constraint.

FIG. 13B is a flowchart that illustrates example operations for a process of executing a query at a federated database.

DETAILED DESCRIPTION

Example 3)—Overview

Figure 1:
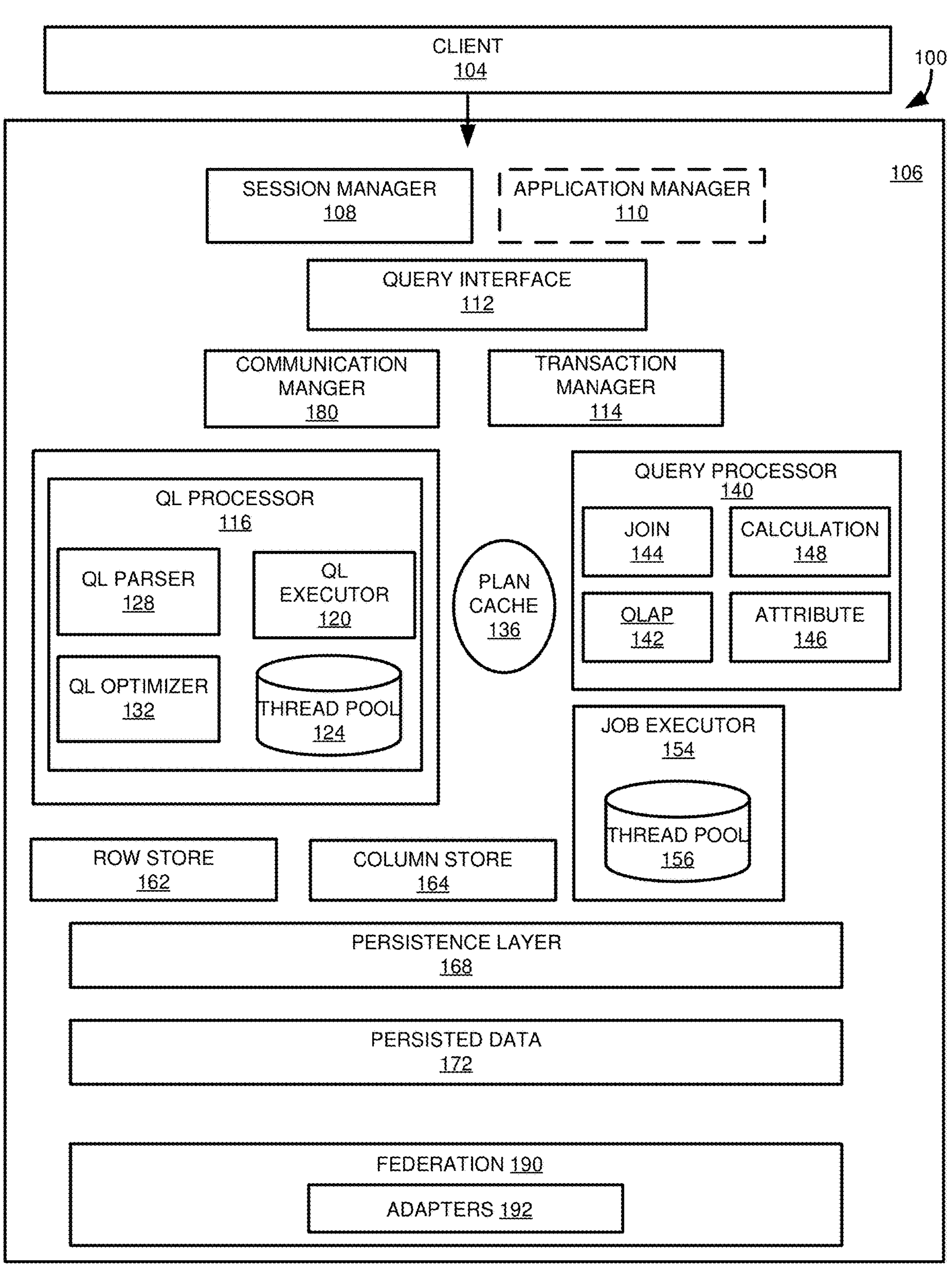
FIG. 1 is a diagram depicting an example database system which can be used in implementing aspects of disclosed technologies.

It is increasingly common for enterprises to have data stored in a variety of systems, including in one or more local (or "on-premise") systems (which may or may not be in physical proximity), in one or more cloud-based systems, or in a combination of local and cloud-based systems. The systems can be of different types—such as storing data in different formats (e.g., a relational database versus a database that stores JSON documents) or storing data using different database management systems (e.g., using software and/or hardware provided by different vendors). Even where data is stored in the same format and using software of the same vendor, differences can exist in what data is stored at a particular location and the schema used to store it.

In order to help address these issues, database federation techniques have been used. In a federated database environment, requests for database operations, such as queries, can specify sources at a local database system or at a "remote" database accessed using data federation. Unlike traditional distributed databases where data is physically replicated across multiple nodes, federated databases allow for virtual integration of data from disparate sources without the need for data replication.

Communication between different databases in a federated environment typically occurs through specialized adapters or APIs that facilitate data access and query execution. These adapters or APIs act as intermediaries between the "source" database system and federated systems, translating requests and responses between the federated system's query language (such as SQL) and the native query languages or protocols supported by the data sources. The "source" database system, also known as the primary database system, refers to the system that receives a query from a client and is primarily responsible for query execution, including communicating with any federated systems referenced by the query.

When a query is executed in a source database system, the query optimizer of the source database system determines the optimal execution plan. While the optimizer primarily generates SQL statements for traditional database systems, in a federated environment, it may generate federated query plans or optimization directives. These plans or directives provide instructions for accessing and processing data from the individual data sources, ensuring efficient query execution across the federated environment.

The data transferred between the source database system and the federated systems typically includes query requests, intermediate results, and final result sets. Query requests contain the necessary information for retrieving the required data, such as select conditions, join criteria, and aggregation functions. Intermediate results may be transferred between federated systems and the source database system during distributed query processing to optimize performance and reduce data transfer overhead. Finally, the final result set, containing the merged and aggregated data from all relevant federated sources, is returned to the source database system for presentation to the user or application.

In summary, federated database systems employ specialized adapters or APIs to facilitate communication between different data sources, enabling seamless integration of data from disparate sources without the need for physical data replication. Query requests and results are transferred between the source system and federated systems using standardized protocols, with data access commands typically being SQL statements or their equivalents. This approach ensures data autonomy and sovereignty by allowing each data source to retain control over its data assets while enabling collaboration and data integration across the federated environment.

Operations with remote data, in some cases, can be performed on the remote system, while in other cases the operations are performed on a source system, and a query optimizer can choose between different plans where operations are performed on different systems. The location where the operations are performed can impact query execution time and computing resource use. For example, if a filter operation or join can be performed on a remote (federated) system, less data may need to be transferred from the remote system to the source system than if a larger set of data were transferred to the source system and the filter/join performed on the local system. However, in some cases a query may have operations that block sending a larger subset of the query operations to a remote system. Accordingly, room for improvement exists.

As an example of how the nature of some query operations may limit what operations can be performed at a federated system, in some cases constraints may not be explicitly expressed in a query, but might be inserted into a query plan by a query optimizer. For example, a query optimizer may determine that explicit query operations involve a constraint, such as a scalar subquery, where a scalar subquery is one that returns exactly one value. This value may be the value of a single attribute or a calculated value derived from multiple rows or attributes, but ultimately, it is a single scalar result. That is, a scalar subquery involves evaluating an equality condition, which will fail if multiple values are returned from the subquery and compared with some other value. The scalar subquery can be written as a combination of a group by operation and a join operation, but in doing so, the equality condition is removed and the query will not fail if multiple rows satisfy a selection condition.

To help ensure that a rewritten query produces the same results as the original query, including query failure, a constraint can be added to the query plan that ensures that at most one record is returned for each selection condition. During query execution, if the constraint is not satisfied, the query can be terminated with a failure operation.

However, typically, data federation techniques only allow for the transfer of SQL operations—not portions of a query plan that might reflect a constraint. Since the constraint cannot be sent to a federated system for enforcement, operations are typically not performed at the federated system. Instead, they are performed at the source database system, even though this may require transferring more data from the federated system. For example, the final result of a query that includes a scalar subquery could ultimately be a single value, or the query could return a complete record if the scalar subquery's value is used in a larger condition. If an equivalent join could be sent to the federated data source, in the case of a scalar subquery rewritten as a join, only the values for a single record would need to be transferred if the constraint is evaluated at the federated system. In contrast, without remote evaluation of the constraint, thousands or millions of rows might need to be transferred to the source database system for processing. However, even in the event where the reduction in data to be transferred is less significant, or even not present, all data is still typically transferred to the source database system so that the constraint can be evaluated. If it turns out that the constraint is violated, the query can be failed, but the resources in transferring data were "wasted" as compared with a scenario where compliance could be determined on the federated data source prior to data transfer.

For at least certain types of operations, portions of a query may be rewritten in a way that helps maintain the intent of the original query. For example, a LIMIT statement can be introduced to ensure that a single value is returned in the case of a scalar subquery rewritten as a group by over a join operation. However, in that situation, the query will still return a result even if, under the original query, the query would fail, either because of the explicit operations in the original query or a constraint added to a query plan of a written query as part of query optimization. Allowing a query to fail can be beneficial as it prevents the execution of potentially flawed or unintended queries.

The present disclosure addresses these techniques through the introduction of keywords that act as constraints on query operations. In some cases, these constraints be introduced during query rewriting, such as by a query optimizer. In other cases, the constraints can be specified in an original query. Constraints can be implemented in a variety of ways. For example, a constraint can be specified for a particular query operation, such as a keyword specifying a constraint that will be used with a scalar subquery. In another example, constraints can be specified based on the nature of the constraint, and then can be used in different operations where the constraint is relevant, such as evaluating uniqueness in various query contexts.

Note that a constraint, as used in describing disclosed innovations, refers to a constraint where if the constraint is violated query execution fails, as opposed to other types of constraints where query results might be forced to a particular result or result type, such as providing a single value or a NULL value, but would not fail. Accordingly, in another implementation, a keyword can generally specify a constraint, where the query should fail if a particular condition is not satisfied. A query optimizer or executor can include logic for determining the exact conditions for a constraint based on the query operations to which the constraint is applied (such as by surrounding query options, such as group by operations, join operations, other types of aggregations, or checks to see whether particular values are or are not present in a data set). As an example, if a query includes a general keyword indicating a constraint, the query optimizer or executor can determine that the constraint is associated with a scalar subquery, and then can determine that the implementation of the constraint for the scalar subquery should be used, and should cause query execution to fail if more than one value is returned and used in evaluating an equality condition.

Typically, a database that optimizes a query and another database that executes a portion of the query, such a federated system, support the particular keyword that identifies the constraint. In this way, more types of query operations can be performed by federated systems, which can reduce data transfer, either by identifying that a query should fail prior to sending data from the federated system to the source database system, or by limiting the amount of data that is transferred to the source database system (such as by providing execution results from the federated system, as opposed to data to be used by the source database system in generating execution results).

Disclosed techniques can provide advantages compared with other possible approaches to implementing constraints in a way that can be sent to other database systems, such as using detailed SQL constructs like CASE statements. For example, the keyword can encapsulate complex logic behind a simple and intuitive term, making SQL queries more readable and easier to understand. In contrast, alternative techniques can lead to more complex and harder-to-read SQL code.

The use of a specific keyword can give the SQL optimizer more flexibility and lead to more efficient execution plans compared to using specific constructs. The SQL optimizer has a clear understanding of the functionality the constraint keyword represents, allowing it to handle that functionality in different ways depending on the specifics of the query and the data. This could include using case statements, introducing new query plan operators, or other techniques.

On the other hand, when specific constructs like case statements are used, they represent very specific logic. This can limit the optimizer's flexibility in rewriting or optimizing those constructs, as it has to preserve the exact semantics of those constructs. As a result, the optimizer might not be able to generate as efficient an execution plan as it could when a more flexible keyword is used.

When the keyword constraint is violated (i.e., more than one value is returned), the query execution fails immediately. This can make it easier to catch and handle errors. In contrast, with the alternative technique, the error might not be caught until later stages of query execution, which could lead to more complex error handling scenarios.

Using a constraint keyword can lead to more consistent query code. This is because the same logic is always expressed using the same keyword. In contrast, with the alternative technique, the same logic might be expressed using different SQL constructs in different parts of the code, depending on the specifics of the query plan.

Further, having the constraint keyword can increase the portability of query language code, since the same keyword across different SQL engines. In contrast, alternative techniques might rely on features that are specific to a particular query, which can limit code portability.

Example 2 describes an example database system that can be used in implementing disclosed technologies. The database system can be an example of either a source database system or a federated system that is accessed by the local system. Example 3 provides an example of a virtual table, where the virtual table includes a logical pointer that can be updated to point to different locations, including a location in a federated system or a location in a local database system (including a local table, or a table maintained in a cache). It should be appreciated that a virtual table can be implemented in a different manner, including in a way that is "statically" mapped to a particular federated data source of a particular federated system. Examples 4-8 more specifically describe disclosed techniques for expressing query execution constraints in a form that can be transmitted to a federated system.

Example 4)—Example Database Architecture

Database systems commonly operate using online transaction processing (OLTP) workloads, which are typically transaction-oriented, or online analytical processing (OLAP) workloads, which typically involve data analysis. OLTP transactions are commonly used for core business functions, such as entering, manipulating, or retrieving operational data, and users typically expect transactions or queries to be completed quickly. For example, OLTP transactions can include operations such as INSERT, UPDATE, and DELETE, and comparatively simple queries. OLAP workloads typically involve queries used for enterprise resource planning and other types of business intelligence. OLAP workloads commonly perform few, if any, updates to database records, rather, they typically read and analyze past transactions, often in large numbers.

FIG. 1 illustrates an example database environment 100. The database environment 100 can include a client 104. Although a single client 104 is shown, the client 104 can represent multiple clients. The client or clients 104 may be OLAP clients, OLTP clients, or a combination thereof.

The client 104 is in communication with a database server 106. Through various subcomponents, the database server 106 can process requests for database operations, such as requests to store, read, or manipulate data (i.e., CRUD operations). A session manager component 108 can be responsible for managing connections between the client 104 and the database server 106, such as clients communicating with the database server using a database programming interface, such as Java Database Connectivity (JDBC), Open Database Connectivity (ODBC), or Database Shared Library (DBSL). Typically, the session manager 108 can simultaneously manage connections with multiple clients 104. The session manager 108 can carry out functions such as creating a new session for a client request, assigning a client request to an existing session, and authenticating access to the database server 106. For each session, the session manager 108 can maintain a context that stores a set of parameters related to the session, such as settings related to committing database transactions or the transaction isolation level (such as statement level isolation or transaction level isolation).

For other types of clients 104, such as web-based clients (such as a client using the HTTP protocol or a similar transport protocol), the client can interface with an application manager component 110. Although shown as a component of the database server 106, in other implementations, the application manager 110 can be located outside of, but in communication with, the database server 106. The application manager 110 can initiate new database sessions with the database server 106, and carry out other functions, in a similar manner to the session manager 108.

The application manager 110 can determine the type of application making a request for a database operation and mediate execution of the request at the database server 106, such as by invoking or executing procedure calls, generating query language statements, or converting data between formats useable by the client 104 and the database server 106. In particular examples, the application manager 110 receives requests for database operations from a client 104, but does not store information, such as state information, related to the requests.

Once a connection is established between the client 104 and the database server 106, including when established through the application manager 110, execution of client requests is usually carried out using a query language, such as the structured query language (SQL). In executing the request, the session manager 108 and application manager 110 may communicate with a query interface 112. The query interface 112 can be responsible for creating connections with appropriate execution components of the database server 106. The query interface 112 can also be responsible for determining whether a request is associated with a previously cached statement or a stored procedure, and calling the stored procedure or associating the previously cached statement with the request.

At least certain types of requests for database operations, such as statements in a query language to write data or manipulate data, can be associated with a transaction context. In at least some implementations, each new session can be assigned to a transaction.

Transactions can be managed by a transaction manager component 114. The transaction manager component 114 can be responsible for operations such as coordinating transactions, managing transaction isolation, tracking running and closed transactions, and managing the commit or rollback of transactions. In carrying out these operations, the transaction manager 114 can communicate with other components of the database server 106.

The query interface 112 can communicate with a query language processor 116, such as a structured query language processor. For example, the query interface 112 may forward to the query language processor 116 query language statements or other database operation requests from the client 104. The query language processor 116 can include a query language executor 120, such as a SQL executor, which can include a thread pool 124. Some requests for database operations, or components thereof, can be executed directly by the query language processor 116. Other requests, or components thereof, can be forwarded by the query language processor 116 to another component of the database server 106. For example, transaction control statements (such as commit or rollback operations) can be forwarded by the query language processor 116 to the transaction manager 114. In at least some cases, the query language processor 116 is responsible for carrying out operations that retrieve or manipulate data (e.g., SELECT, UPDATE, DELETE). Other types of operations, such as queries, can be sent by the query language processor 116 to other components of the database server 106. The query interface 112, and the session manager 108, can maintain and manage context information associated with requests for database operation. In particular implementations, the query interface 112 can maintain and manage context information for requests received through the application manager 110.

When a connection is established between the client 104 and the database server 106 by the session manager 108 or the application manager 110, a client request, such as a query, can be assigned to a thread of the thread pool 124, such as using the query interface 112. In at least one implementation, a thread is associated with a context for executing a processing activity. The thread can be managed by an operating system of the database server 106, or by, or in combination with, another component of the database server. Typically, at any point, the thread pool 124 contains a plurality of threads. In at least some cases, the number of threads in the thread pool 124 can be dynamically adjusted, such in response to a level of activity at the database server 106. Each thread of the thread pool 124, in particular aspects, can be assigned to a plurality of different sessions.

When a query is received, the session manager 108 or the application manager 110 can determine whether an execution plan for the query already exists, such as in a plan cache 136. If a query execution plan exists, the cached execution plan can be retrieved and forwarded to the query language executor 120, such as using the query interface 112. For example, the query can be sent to an execution thread of the thread pool 124 determined by the session manager 108 or the application manager 110. In a particular example, the query plan is implemented as an abstract data type.

If the query is not associated with an existing execution plan, the query can be parsed using a query language parser 128. The query language parser 128 can, for example, check query language statements of the query to make sure they have correct syntax, and confirm that the statements are otherwise valid. For example, the query language parser 128 can check to see if tables and records recited in the query language statements are defined in the database server 106.

The query can also be optimized using a query language optimizer 132. The query language optimizer 132 can manipulate elements of the query language statement to allow the query to be processed more efficiently. For example, the query language optimizer 132 may perform operations such as unnesting queries or determining an optimized execution order for various operations in the query, such as operations within a statement. After optimization, an execution plan can be generated, or compiled, for the query. In at least some cases, the execution plan can be cached, such as in the plan cache 136, which can be retrieved (such as by the session manager 108 or the application manager 110) if the query is received again.

In disclosed techniques, the query language optimizer 132 can determine portions of a query plan that access federated data sources, and can determine portions of the query plan that are sent to corresponding federated systems for execution. The query language optimizer 132 can rewrite portions of a query for more efficient execution, including generating subplans that improve efficiency by having operations performed at a federated system rather than the source database system. In rewriting portions of a query, the query language optimizer 132 can rewrite query operations that may be implicitly associated with a constraint in a first version of the query as operations that explicitly set forth the constraint in a rewritten query language representation of the operations.

Once a query execution plan has been generated or received, the query language executor 120 can oversee the execution of an execution plan for the query. For example, the query language executor 120 can invoke appropriate subcomponents of the database server 106.

In executing the query, the query language executor 120 can call a query processor 140, which can include one or more query processing engines. The query processing engines can include, for example, an OLAP engine 142, a join engine 144, an attribute engine 146, or a calculation engine 148. The OLAP engine 142 can, for example, apply rules to create an optimized execution plan for an OLAP query. The join engine 144 can be used to implement relational operators, typically for non-OLAP queries, such as join and aggregation operations. In a particular implementation, the attribute engine 146 can implement column data structures and access operations. For example, the attribute engine 146 can implement merge functions and query processing functions, such as scanning columns.

In certain situations, such as if the query involves complex or internally parallelized operations or sub-operations, the query executor 120 can send operations or sub-operations of the query to a job executor component 154, which can include a thread pool 156. An execution plan for the query can include a plurality of plan operators. Each job execution thread of the job execution thread pool 156, in a particular implementation, can be assigned to an individual plan operator. The job executor component 154 can be used to execute at least a portion of the operators of the query in parallel. In some cases, plan operators can be further divided and parallelized, such as having operations concurrently access different parts of the same table. Using the job executor component 154 can increase the load on one or more processing units of the database server 106, but can improve execution time of the query.

The query processing engines of the query processor 140 can access data stored in the database server 106. Data can be stored in a row-wise format in a row store 162, or in a column-wise format in a column store 164. In at least some cases, data can be transformed between a row-wise format and a column-wise format. A particular operation carried out by the query processor 140 may access or manipulate data in the row store 162, the column store 164, or, at least for certain types of operations (such a join, merge, and subquery), both the row store 162 and the column store 164. In at least some aspects, the row store 162 and the column store 164 can be maintained in main memory.

A persistence layer 168 can be in communication with the row store 162 and the column store 164. The persistence layer 168 can be responsible for actions such as committing write transactions, storing redo log entries, rolling back transactions, and periodically writing data to storage to provide persisted data 172.

In executing a request for a database operation, such as a query or a transaction, the database server 106 may need to access information stored at another location, such as another database server. The database server 106 may include a communication manager 180 component to manage such communications. The communication manger 180 can also mediate communications between the database server 106 and the client 104 or the application manager 110, when the application manager is located outside of the database server.

In some cases, the database server 106 can be part of a distributed database system that includes multiple database servers. At least a portion of the database servers may include some or all of the components of the database server 106. The database servers of the database system can, in some cases, store multiple copies of data. For example, a table may be replicated at more than one database server. In addition, or alternatively, information in the database system can be distributed between multiple servers. For example, a first database server may hold a copy of a first table and a second database server can hold a copy of a second table. In yet further implementations, information can be partitioned between database servers. For example, a first database server may hold a first portion of a first table and a second database server may hold a second portion of the first table.

In carrying out requests for database operations, the database server 106 may need to access other database servers, or other information sources, within the database system, or at external systems, such as an external system on which a parameterized data object is located. The communication manager 180 can be used to mediate such communications. For example, the communication manager 180 can receive and route requests for information from components of the database server 106 (or from another database server) and receive and route replies.

The database server 106 can include components to coordinate data processing operations that involve remote data sources. In particular, the database server 106 includes a data federation component 190 that at least in part processes requests to access data maintained at remote system. In carrying out its functions, the data federation component 190 can include one or more adapters 192, where an adapter can include logic, settings, or connection information usable in communicating with remote systems, such as in obtaining information to help generate virtual parameterized data objects or to execute requests for data using virtual parameterized data objects (such as issuing a request to a remote system for data accessed using a corresponding parameterized data object of the remote system). Examples of adapters include "connectors" as implemented in technologies available from SAP SE, of Walldorf, Germany. Further, disclosed techniques can use technologies underlying data federation techniques such as Smart Data Access (SDA) and Smart Data Integration (SDI) of SAP SE.

Example 5)—Example Virtual Tables, Including with Updatable Logical Pointers

Figure 2:
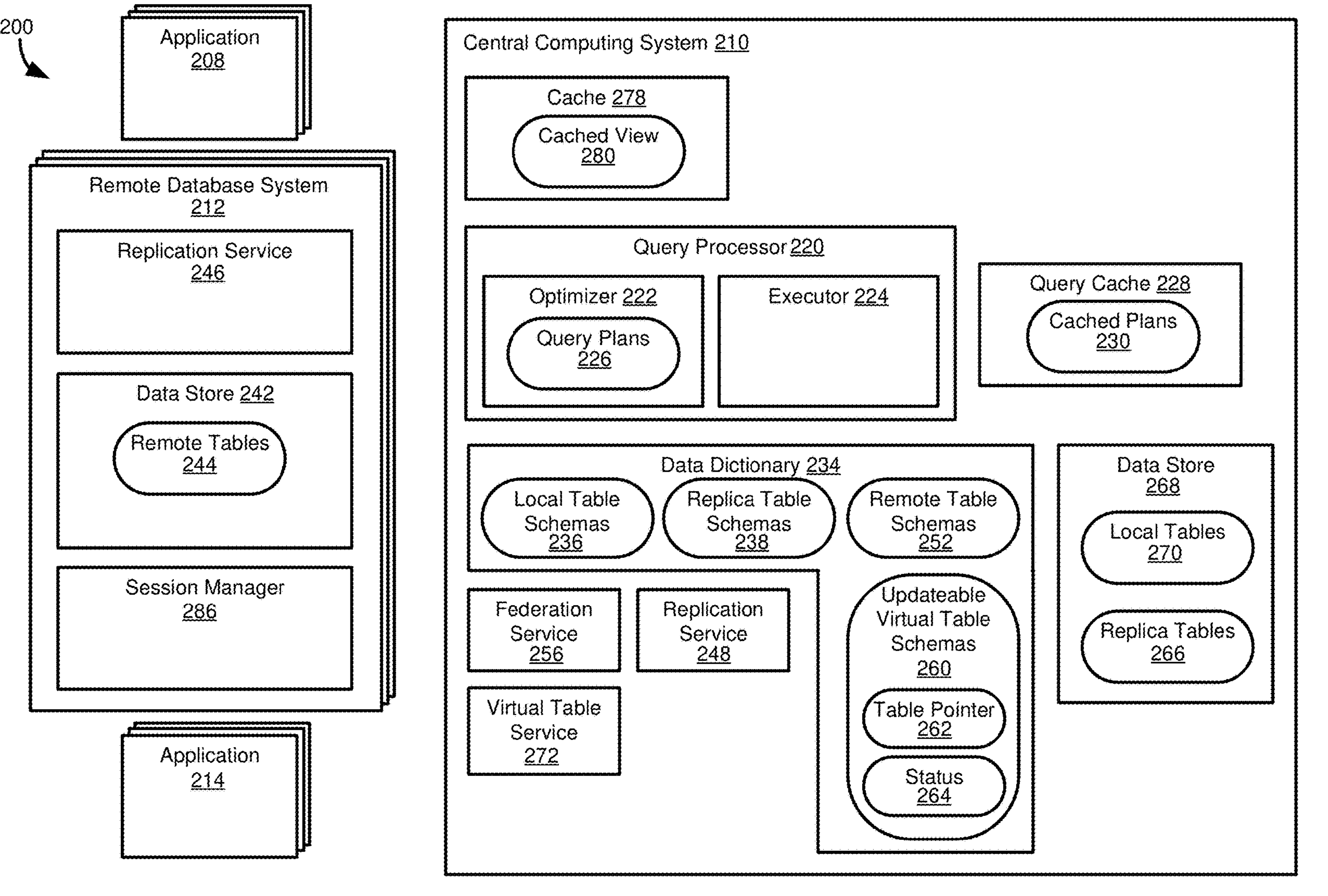
FIG. 2 is a diagram depicting a computing environment in which a database system can access data in a remote computing system using data federation, including through virtual tables mapped to remote tables of the remote computing system.

FIG. 2 illustrates a computing environment 200 in which disclosed embodiments can be implemented. The basic computing environment 200 of FIG. 2 includes a number of features that can be common to different embodiments of the disclosed technologies, including one or more applications 208 that can access a central computing system 210, which can be a cloud computing system. The central computing system 210 is shown as a monolithic/unitary system, but it should be appreciated that, particularly in a cloud environment, the central computing system can include a number of computing systems that function together as a single system. For example, the central computing system 210 can be implemented as a plurality of "nodes," including an anchor node and zero or more non-anchor nodes. A central computing system 210 can also be a more typical "distributed" database system, which includes a master node and one or more worker nodes.

The central computing system 210 can act as such by providing access to data stored in one or more remote database systems 212, where the remote database systems can be federated systems having federated data sources. In turn, the remote database systems 212 can be accessed by one or more applications 214. In some cases, an application 214 can also be an application 208. That is, some applications may only (directly) access data in the central computing system 210, some applications may only access data in a remote database system 212, and other applications may access data in both the central computing system and in a remote database system.

The central computing system 210 can include a query processor 220. The query processor 220 can include multiple components, including a query optimizer 222 and a query executor 224. The query optimizer 222 can be responsible for determining a query execution plan 226 for a query to be executed using the central computing system 210. The query plan 226 generated by the query optimizer 222 can include both a logical plan indicating, for example, an order of operations to be executed in the query (e.g., joins, projections) and a physical plan for implementing such operations. Once developed by the query optimizer 222, a query plan 226 can be executed by the query executor 224. Query plans 226 can be stored in a query plan cache 228 as cached query plans 230. When a query is resubmitted for execution, the query processor 220 can determine whether a cached query plan 230 exists for the query. If so, the cached query plan 230 can be executed by the query executor 224. If not, a query plan 226 is generated by the query optimizer 222. In some cases, cached query plans 230 can be invalidated, such as if changes are made to a database schema, or at least components of a database schema (e.g., tables or views) that are used by the query.

A data dictionary 234 can maintain one or more database schemas for the central computing system 210. In some cases, the central computing system 210 can implement a multitenant environment, and different tenants may have different database schemas. In at least some cases, at least some database schema elements can be shared by multiple database schemas.

The data dictionary 234 can include definitions (or schemas) for different types of database objects, such as schemas for tables or views. Although the following discussion references tables for ease of explanation, it should be appreciated that the discussion can apply to other types of database objects, particularly database objects that are associated with retrievable data, such as materialized views. A table schema can include information such as the name of the table, the number of attributes (or columns or fields) in the table, the names of the attributes, the data types of the attributes, an order in which the attributes should be displayed, primary key values, foreign keys, associations to other database objects, partition information, or replication information.

Table schemas maintained by the data dictionary 234 can include local table schemas 236, which can represent tables that are primarily maintained on the central computing system 210. The data dictionary 234 can include replica table schemas 238, which can represent tables where at least a portion of the table data is stored in the central computing system 210 (or which is primarily managed by a database management system of the central computing system, even if stored other than on the central computing system, such as being stored in a data lake or in another cloud service). Tables having data associated with replica tables schemas 238 typically will periodically have their data updated from a source table, such as a remote table 244 (a type of federated data source) of a data store 242 of a remote database system 212.

Replication can be accomplished using one or both of a replication service 246 of the remote database system 212 or a replication service 248 of the central computing system 210. In particular examples, the replication service can be the Smart Data Integration (SDI) service, SAP Landscape Transformation Replication Server, SAP Data Services, SAP Replication Server, SAP Event Stream Processor, or an SAP HANA Direct Extractor Connection, all of SAP SE, of Walldorf, Germany.

In some cases, data in a remote database system 212 can be accessed by the central computing system 210 without replicating data from the remote database system, such as using federation techniques. The data dictionary 234 can store virtual table schemas 252 for virtual tables that are mapped to remote tables, such as a remote table 244 of a remote database system 212. Data in the remote table 244 can be accessed using a federation service 256, such as using the Smart Data Access protocol of SAP SE, of Walldorf, Germany. The federation service 256 can be responsible for converting query operations into a format that can be processed by the appropriate remote database system 212, sending the query operations to the remote database system, receiving query results, and providing the query results to the query executor 224.

The data dictionary 234 can include updatable virtual table schemas 260 that have updatable logical pointers 262. The updated virtual table schemas 260 can optionally be associated with status information 264. The table pointer 262 can be a logical pointer used to identify what table should be accessed for data of the corresponding virtual table schema 260. For example, depending on the state of the table pointer 262, the table pointer can point to the remote table 244 of a remote database system 212 or a replica table 266 (which can be generated from the remote table 244) located in a data store 268 of the central computing system 210. The data store 268 can also store data for local tables 270, which can be defined by the local table schemas 236.

The table pointer 262 can be changed between the remote table 244 and the replica table 266. In some cases, a user can manually change the table pointed to by the table pointer 262. In other cases, the table pointer 262 can be automatically changed, such as in response to the detection of defined conditions.

The status information 264 can include an indicator identifying a virtual table schema 260 as being associated with a remote table 244 or a replica table 266. The status information 264 can also include information about the replication status of a replica table 266. For example, once a request is made to change the table pointer 262 to point to a replica table 266, it may take time before the replica table is ready for use. The status information 264 can include whether a replication process has been started, has been completed, or a progress status of generating the replica table 266.

Changes to updateable virtual table schemas 260 and managing replica tables 266 associated with virtual table schemas can be managed by a virtual table service 272. Although shown as a separate component of the central computing system 210, the virtual table service 272 can be incorporated into other components of the central computing system 210, such as the query processor 220 or the data dictionary 234.

When a query is executed, the query is processed by the query processor 220, including executing the query using the query executor 224 to obtain data from one or both of the data store 242 of the remote database system 212 or the data store 268 of the central computing system 210. Query results can be returned to the application 208. Query results can also be cached, such as in a cache 278 of the central computing system 210. The cached results can be represented as cached views 280 (e.g., materialized query results).

The applications 214 can access data in the remote database system 212, such as through a session manager 286. The applications 214 can modify the remote tables 244. When a table pointer 262 of an updateable virtual table schema 260 references a remote table 244, changes made by the applications 214 are reflected in the remote table. When a table pointer 262 references a replica table 266, changes made by the applications 214 can be reflected in the replica table using the replication service 246 or the replication service 248.

Figure 3A:
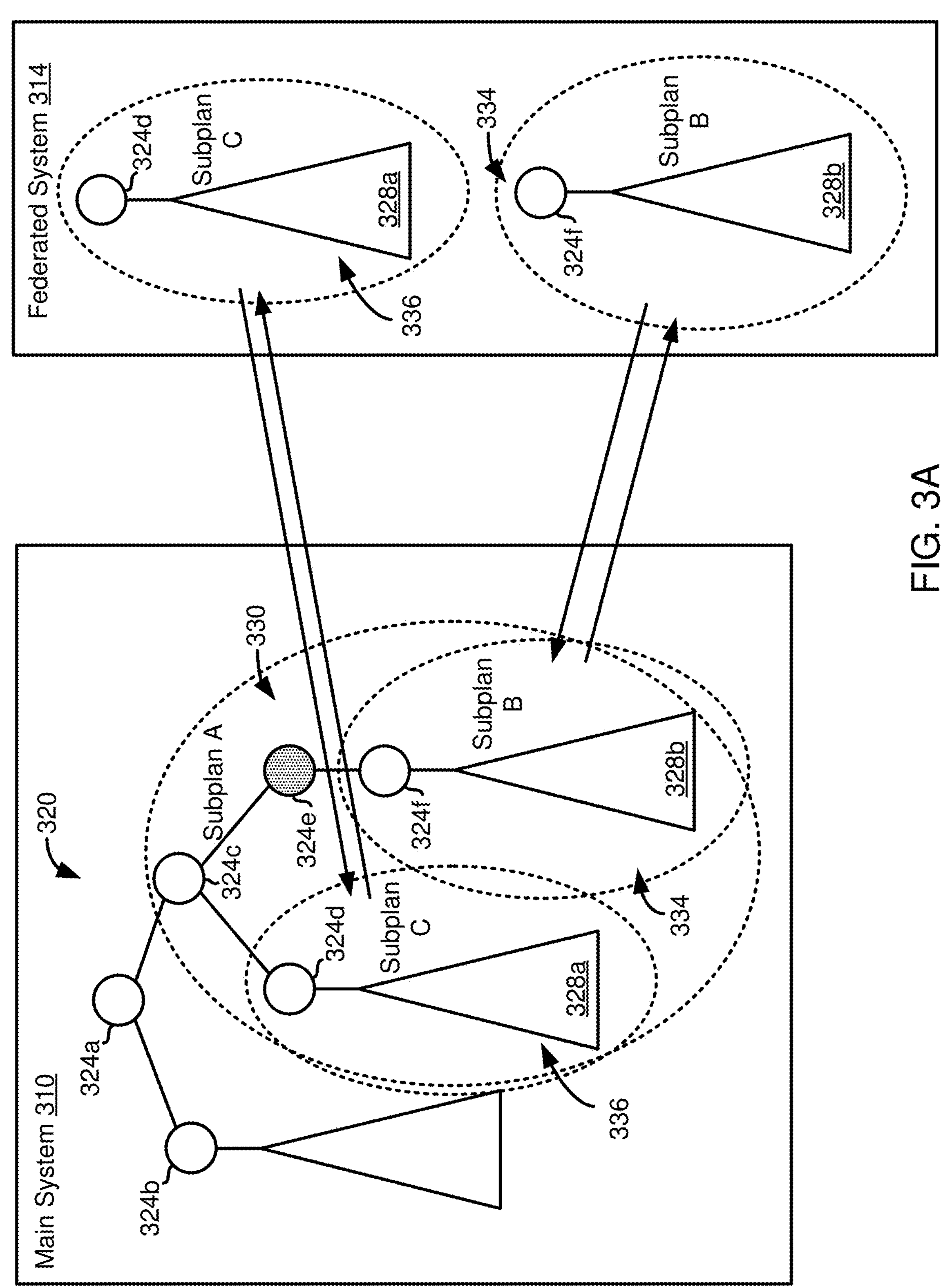
FIG. 3A is a diagram illustrating how constraints in a query plan can prevent larger subplans from being sent to a federated database system for execution.

Example 4—Example Constraints Blocking the Sending of Larger Query Subplans to Federated Systems FIG. 3A provides a high-level diagram illustrating typical operation of queries that involve federated data sources at a federated system. In particular, FIG. 3A illustrates a source system 310 and a federated system 314. The source system 310 can be a system that initially receives a query and performs query optimization, and may also execute certain query operations. For example, the source system 310 can perform query operations with respect to data sources that are directly associated with the source system. The source system 310 can also perform operations with respect to data received from the federated system 314.

The federated system 314 can send query results (such as for a subquery sent to the federated system 314 by the source system 310) to the source system for further processing, which can include combining the results with results of query operations performed at the source system or on a another federated system, or returning results from the federated system 314 in response to the query. As described in Example 1, in some cases certain operations that involve data at the federated system 314 cannot be performed at the federated system even though they involve data of the federated system, such as in the case of a scalar subquery where a single value constraint in a query plan may not be passable to the federated system. In these cases, the federated system 314 sends the relevant data to the source system 310, which then can perform operations such as joins or filtering, even if these operations only involve federated data.

Consider a query plan 320 being processed by the source system 310. The query plan 320 represents operations in the query as nodes 324 (shown as nodes 324*a*-324*f*). Assume that a subplan A, 330, represents operations using data of the federated system 314. Node 324*c* can represent a join operation of data retrieved using subqueries (which can include table scans) of tables 328*a*, 328*b* carried out by nodes 324*d*, 324*f*. Node 324*e* represents a constraint. For example, assume that node 324 is a join produced by rewriting a scalar subquery in an original query provided to the source system 310. The node 324*e* represents a constraint that a result for each value evaluated is a single value, where violation of the constraint causes the query to fail.

A question then is what portions of the query plan 320 can be sent to the federated system 314 for execution. As discussed, typically operations sent to a federated system are expressed in a language such as SQL, rather than sending portions of a query plan. Since the subplan A, 330, includes the constraint, subplan A is not sent to the federated system 314. Rather, an optimization or execution process can determine if a portion of subplan A, 330, can be sent to the federated system 314, since all the operations are expressible in SQL. Subplan B, 334, is identified, which include the nodes 324*d*, 324*f*—table scans of the federated data. These operations can be expressed in SQL, and so subplan B, 334, can be sent to the federated system 314. Similarly, subplan C, 336, can be identified, and sent to the federated system 314. Although both subplans 334, 336 can be sent to the federated system 314, the constraint of the node 324*e* and the join operation 324*c* are still performed at the main system 310.

As noted, not being able to send a larger subplan to the federated system 314 can have disadvantages, such as if a smaller amount of data could have been sent if the constraint of node 324*e* could be represented in a way that the federated system could process. Or, if the constraint could be sent to the federated system 314, even if the amount of data would not be reduced, efficiencies would be provided if query failure could be identified prior to transferring data from the federated system 314 to the source system 310.

Figure 3B:
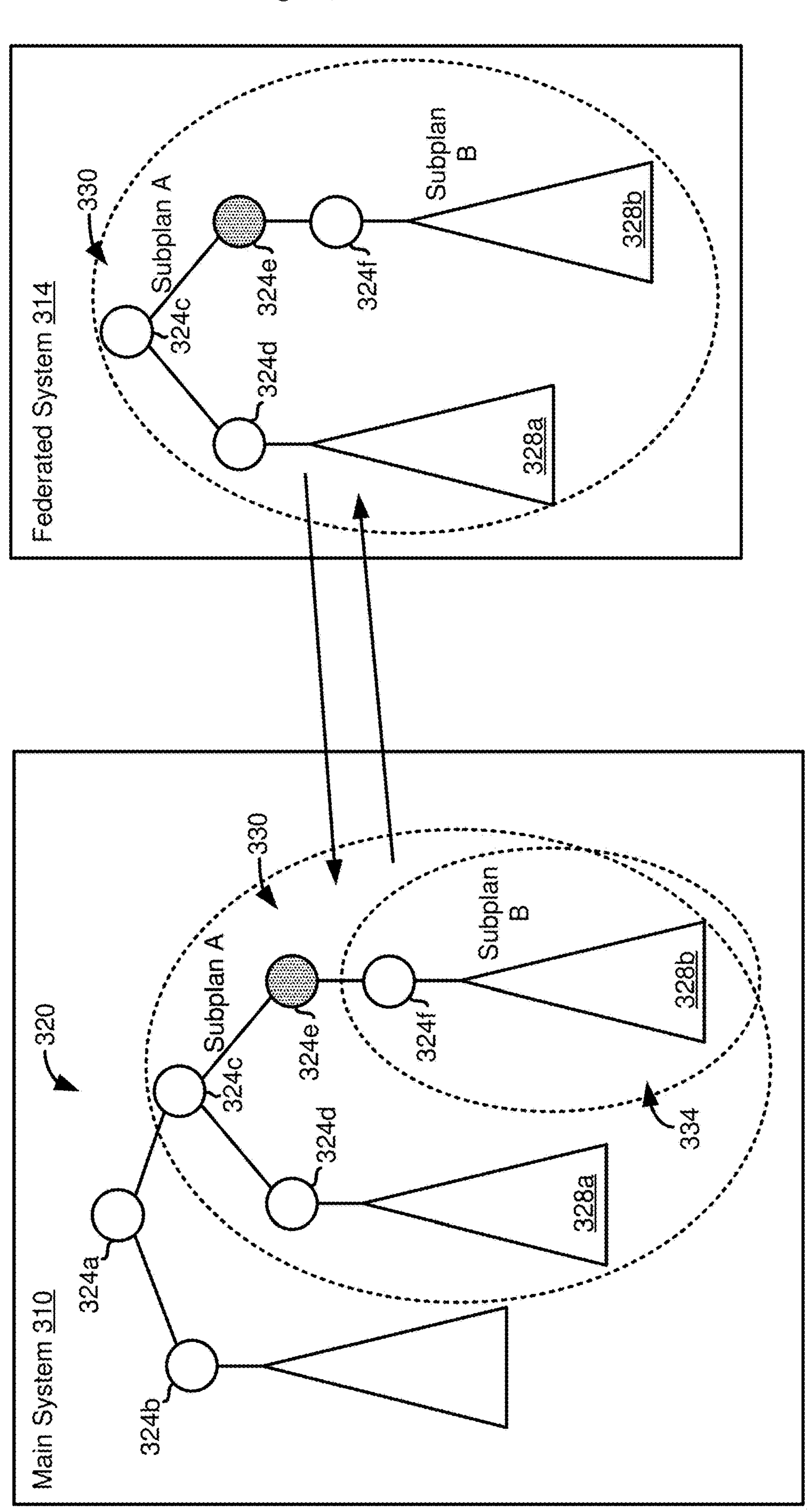
FIG. 3B is a diagram illustrating how larger subplans of the query plan of FIG. 3A can be sent to the federated database system if expressed in a format that can be sent to the federated database system, such as in a query language.

FIG. 3B illustrates that the entire subplan A, 330, can be sent to the federated system 314 if the constraint of node 324*e* can be sent to the federated system.

Although disclosed techniques can be beneficial when federated database systems are used, they can also be useful in other scenarios. For example, constraints can be useful even for queries performed at a single database system. While a constraint can be introduced as part of query rewriting, in some cases it can be beneficial for users or processes to write queries that include a constraint that causes a query to fail if the conditions of the constraint are not satisfied.

Example 5—Example Blocking Constraints Introduced During Rewrite of Scalar Subqueries FIG. 4 illustrates example SQL statements 410, 412 that create two tables, and a SQL statement 414 that defines a SELECT operation that includes a scalar subquery. FIG. 4 also provides a graphical representation 420 of the query.

In the statement 414, SELECT TABLE1.COL1 FROM . . . can be referred to as the main or outer query that selects the column COL1 from TABLE1. The statement 414 includes a scalar subquery of SELECT COL2 FROM TABLE2 WHERE TABLE1.COL3=TABLE2. COL3. For purposes of the use of disclosed techniques, a scalar subquery is one that returns a single value, even if that single value can be used to select multiple values as part of another query operation, such as in the outer SELECT. In the SQL statement 414, the scalar subquery dynamically determines the value of COL2 from TABLE2 based on a condition that relates TABLE1 and TABLE2.

The scalar subquery in SQL statement 414 is used to filter records in TABLE based on a condition that COL2 in TABLE1 must match COL2 from TABLE2 for the corresponding rows where COL3 matches between TABLE1 and TABLE2. The functionality and correctness of this query implicitly rely on the assumption that the subquery (SELECT COL2 FROM TABLE2 WHERE TABLE1. COL3=TABLE2. COL3) will return a single value. This is where the uniqueness constraint comes into play.

If TABLE2. COL3 is not unique or the relationship between TABLE1. COL3 and TABLE2. COL3 does not guarantee a single corresponding TABLE2. COL2 for each TABLE1. COL3, the subquery could potentially return multiple rows, causing the query to fail with an error like "subquery returns more than 1 row."

More specifically, in SQL, in an equality condition in a WHERE clause—like TABLE1. COL2=(subquery)—the expectation is that the subquery on the right-hand side of the equality operator will return exactly one value. This is because the equality operator (=) is designed to compare a single value from the left-hand side with another single value from the right-hand side. When the subquery in the SQL statement returns multiple values, the equality comparison TABLE1. COL2=(subquery) becomes invalid because the right-hand side does not resolve to a single value. SQL cannot compare one value to multiple values using the equality operator, leading to a runtime error.

Figure 5:
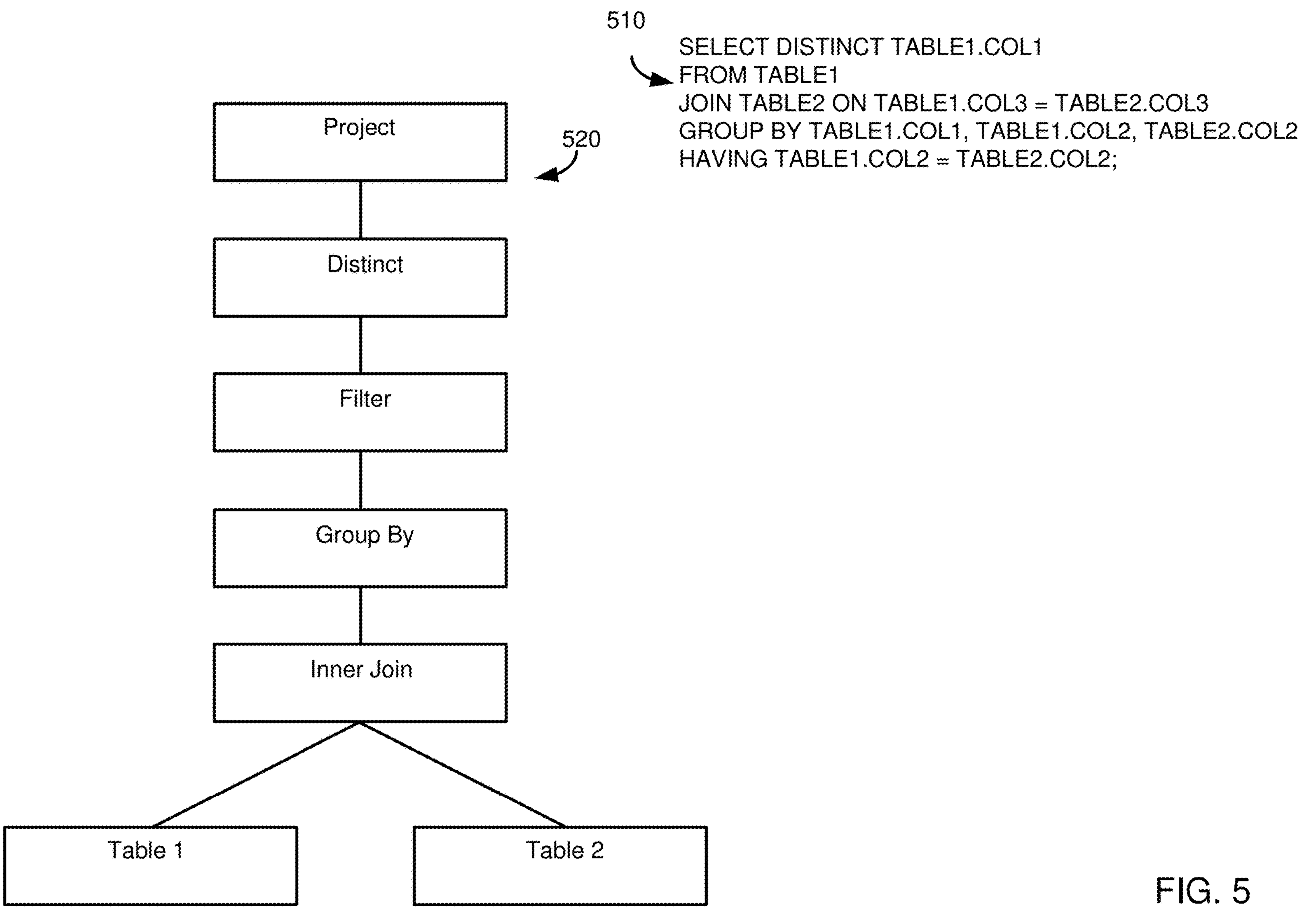
FIG. 5 illustrates how the SQL statement of FIG. 4 can be rewritten to have a group by over a join operation in place of the scalar subquery in the SQL statement of FIG. 4, as well as a graphical depiction of operations in executing the rewritten SQL statement.

FIG. 5 introduces SQL statement 510, which rewrites the original query from SQL statement 414 by eliminating the scalar subquery and substituting it with a straightforward join operation. This figure also includes a visual representation 520 of the modified query. Previously, SQL statement 414 used nested WHERE clauses, leading to potential failures if the scalar subquery returned multiple values. Unlike SQL statement 414, SQL statement 510 removes the nested WHERE clauses, allowing both the join operation and the WHERE clause to handle multiple results without causing the query to fail. Specifically, using a HAVING clause with TABLE1. COL2=TABLE2. COL2 allows for multiple matching rows. This is because the HAVING clause evaluates each row pair individually, in contrast to the scalar subquery's approach which, upon encountering multiple matches, would attempt a single-value comparison and potentially fail.

As discussed, query optimizers can enhance rewritten queries, such as through constraints in a query plan, to mirror the original query's operational characteristics, including the enforcement of uniqueness constraints that are intrinsic to scalar subqueries. In the example query execution plan 600 (in the form of an explain plan) shown in FIG. 6, one of the key optimizer constraints included is the management of data retrieval through table scans in Step 1. The table scan operations on TABLE1 and TABLE2, not only ensure that data fetched meets the join condition t1. COL3=t2. COL3 but also enforces uniqueness similar to a unique index on these columns. If the table scans or subsequent operations detect multiple matches for what should be a unique join condition, the optimizer can be configured to flag this as an error, causing the query to fail, thus preventing data integrity issues and ensuring robust error handling.

In the example query execution plan, Step 2 involves a filter operation that refines the dataset further. This operation, while not explicitly mentioned in the rewritten SQL statement, acts under optimizer-imposed constraints. It verifies the match of t1. COL3 to t2. COL3 and ensures that these matches are unique. If multiple rows from TABLE2 correspond to a single row in TABLE1 in a manner that violates the assumed uniqueness, this filter operation can trigger a failure, replicating the behavior of the scalar subquery where multiple returns would invalidate the query. This enforcement maintains the integrity of the query by ensuring that the join condition results in a uniquely defined dataset, preventing the potential for ambiguous or erroneous data processing.

The nested loop join operation of Step 3 combines the filtered rows of TABLE1 and TABLE2 based the JOIN condition TABLE1. COL2=TABLE2. COL2. It iterates through each row of one table and matches it with corresponding rows from the other table, producing the join result.

The hash aggregate operation of Step 4 performs a grouping operation on the filtered dataset from TABLE1, grouping rows based on the values of COL1. This constraint ensures that each distinct value of COL1 forms a separate group, and aggregate functions, such as COUNT or SUM, are computed within each group. By applying the group by constraint, the operation ensures that aggregation is performed correctly and that each group represents a unique value of COL1. This helps replicate the behavior of the original scalar subquery, where aggregation is performed over distinct values of COL1, resulting in a final result that closely aligns with the original query's output.

Having both the filter and group by constraints in the query plan is beneficial for query optimization and accuracy. The filter constraint reduces the dataset to only the relevant rows before performing the grouping operation, eliminating unnecessary data processing. The group by constraint ensures that aggregation is performed accurately over distinct values of COL1, providing a final result that closely matches the behavior of the original scalar subquery. Together, these constraints optimize query execution, improve performance, and ensure the correctness of the query result, making the query plan more robust and efficient.

As explained, while SQL statement 510 can be executed by a federated system, optimizer constraints typically cannot be transferred to the federated system. Therefore, the operations for the rewritten version (SQL statement 510) of the scalar subquery (SQL statement 414) are usually performed by the source system after receiving the necessary data from the federated system. Alternatively, the original scalar subquery itself can be sent to the federated system for execution.

Switching from a scalar subquery to a simple join in SQL queries can offer significant performance benefits, particularly when dealing with large datasets, due to several underlying efficiency and resource utilization factors. Scalar subqueries are executed once for each row in the outer query, which means that if the outer query processes a large number of rows, the scalar subquery also needs to be executed an equally large number of times. This repetitive execution can be highly inefficient, especially if the subquery involves complex calculations or accesses large tables. Each execution of the scalar subquery involves its own set of data fetching and processing, including parsing the SQL, planning the query, and possibly reading from disk if the data is not cached, which consumes CPU and I/O resources heavily when repeated.

In contrast, a simple join is generally processed in a single pass through the data using optimized algorithms such as hash joins or merge joins. Modern database systems are highly optimized for join operations, utilizing indexes, partitioning, and in-memory data structures to efficiently find matching rows, thereby reducing disk I/O and speeding up data retrieval. Furthermore, joins typically make better use of database resources. Unlike scalar subqueries that can lead to high load on database resources through repeated disk access, joins optimize memory use and support parallel processing, which can significantly reduce query execution times.

Moreover, joins improve data locality and caching. Repeated execution of scalar subqueries can prevent effective use of the database's cache as each execution might need to load data into memory, potentially evicting other valuable data from the cache. However, with joins, especially if the tables are properly indexed or if the database engine can preload the necessary data into memory, much of the operation can be confined to RAM, which is much faster than disk operations. Efficient use of the cache and memory leads to faster data processing and less strain on the database's physical I/O systems.

Finally, the scalability of joins tends to be better than that of scalar subqueries. Scalar subqueries that perform poorly can dramatically worsen as data volume grows, with total time and resource cost scaling linearly with data volume. In contrast, joins follow a more predictable performance curve and can handle increases in data volume more gracefully, benefiting from batch processing, parallel execution, and optimized memory management. This makes joins particularly suited for high-volume or complex query environments, where they can reduce execution times, lower resource consumption, improve cache utilization, and provide overall better scalability. These factors collectively make the use of simple joins a preferable approach in large-scale database management systems, enhancing performance and efficiency significantly compared to scalar subqueries.

Figure 7:
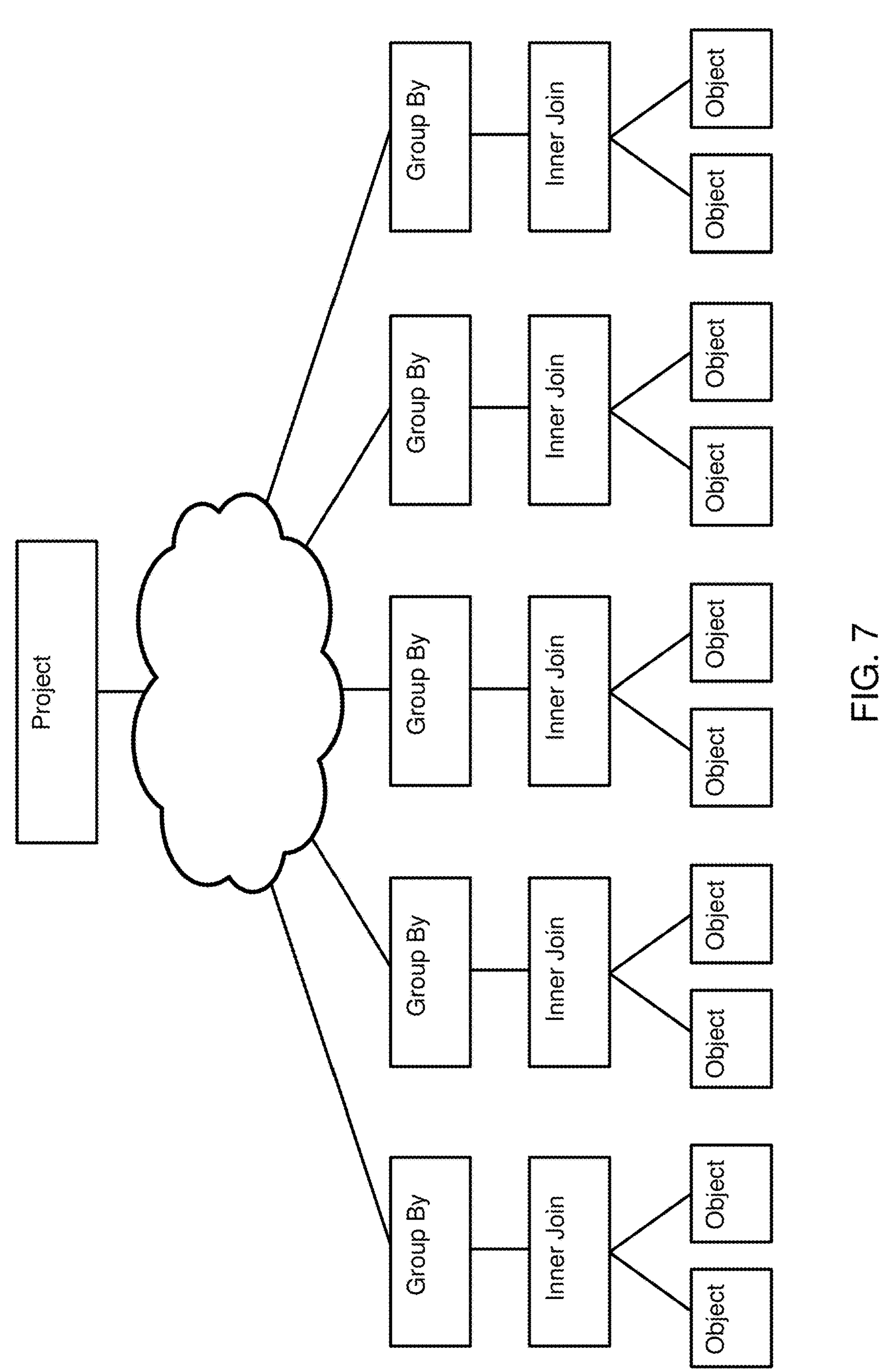
FIG. 7 is a diagram illustrating how a query can be associated with multiple scalar subqueries which can be rewritten as group by over join operations, where performance of the rewritten scalar subqueries can improve query performance using disclosed techniques.

The advantages described above can be compounded because queries, such as in enterprise database systems, can often be extraordinarily complex. A single query might include many scalar subqueries for federated data sources where performance benefits could be realized by rewriting the scalar subqueries as joins, as shown in FIG. 7, where an object on which a join is performed can be, in some examples, a database table or view.

Example 6—Example Constraint Representations Useable by Federated Systems

Figure 8:
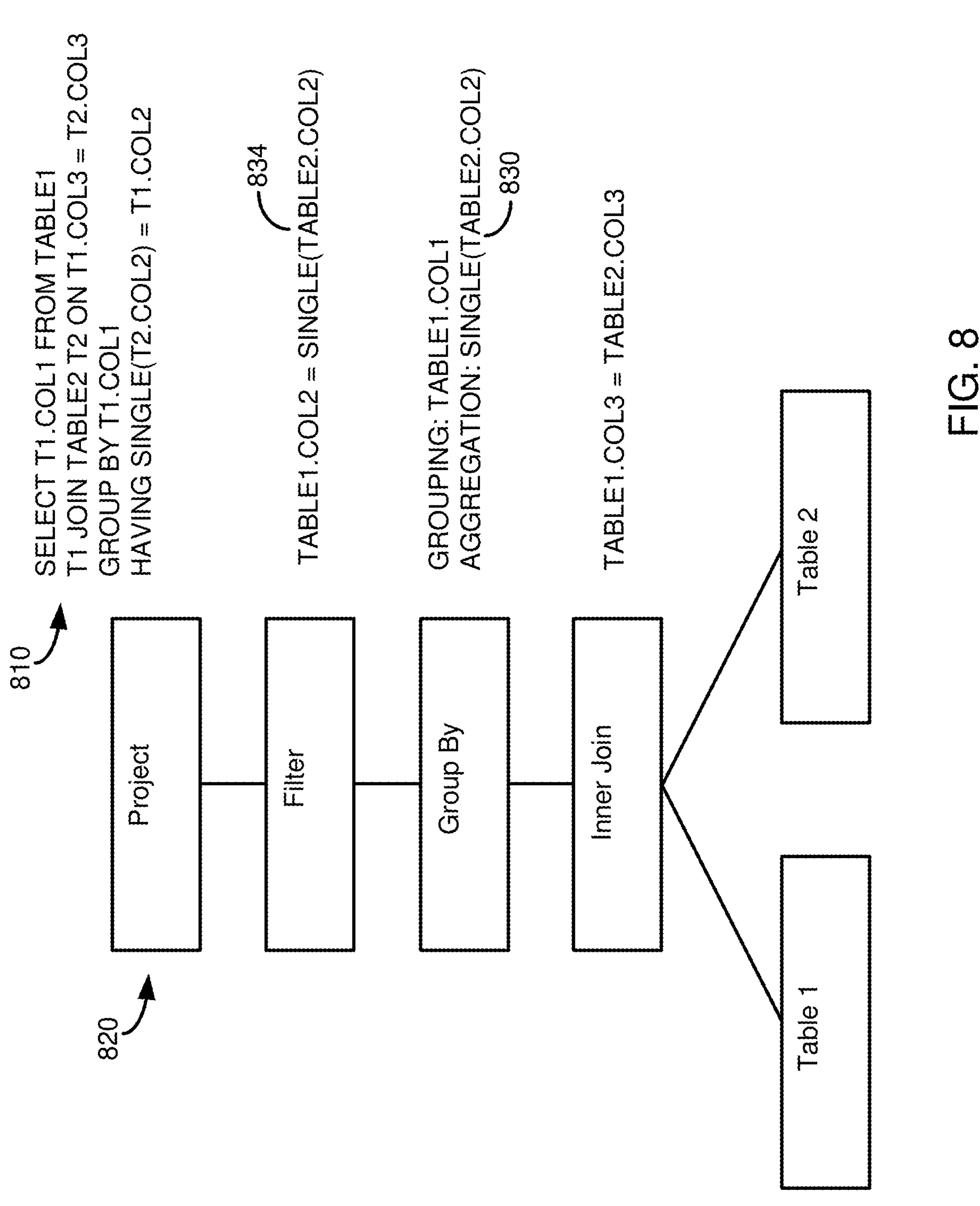
FIG. 8 illustrates a technique according to the present disclosure, where a query is rewritten, and includes constraints that can be expressed in a query language representation of the rewritten query.

FIG. 8 illustrates a particular technique of the present example, where a SQL (or other query processing language) keyword is introduced into a version 810 of the query 510 that represents a constraint, where if the constraint is not satisfied the query ceases execution/fails. In this particular example, the keyword "SINGLE" is used to indicate that only one value should be provided for a provided argument, such as a particular table column.

FIG. 8 also provides a graphical depiction 820 of the query 810. The graphical depiction 820 includes a grouping constraint 830 and a filter constraint 834, corresponding to the constraints discussed in association with the query plan 600 of FIG. 6.

The "SINGLE" keyword can be associated with one or more functions that determine whether a given constraint is satisfied. FIG. 9 provides an example python function 910 for implementing the filter constraint and an example python function 920 for implementing the group by constraint.

FIG. 10 provides a table 1000 providing an explanation of the query 810 of FIG. 8, where the table includes a column 1014 providing an operator name and a column 1018 providing additional details for a given operator. Operations above the dashed line are performed at the source system, while operations below the dashed line are performed at the remote system. It can be seen the disclosed techniques allow operations associated with the group by over join representation of the scalar subquery to be executed at the remote system, providing the efficiencies previously described.

In the case of the "SINGLE" keyword, depending on implementation, the keyword can be specific to join operations corresponding to a rewritten scalar subquery, or can be used in other situations where it is desired to check when a single value is associated with a particular argument.

In other scenarios, a keyword can specify that a query should fail if a constraint is not satisfied, but the keyword can be used with a variety of constraints. For example, instead of the "SINGLE" keyword, a keyword of "CONSTRAINT" could be used. Logic of a query processor can then determine the appropriate constraint to be used, such as depending on the argument provided or the context surrounding the keyword. In the case of the SQL statement 810, the context could include the argument being a table column and that the keyword is used with respect to a group by operation on the result of a join.

The following discussion provides additional examples of how the CONSTRAINT keyword can be used. This following query retrieves data from a employees table, but fails if any of the retrieved salaries are below a certain threshold (e.g., $30,000).

```
SELECT
FROM employees
CONSTRAINT salary >= 30000;
```

This following query calculates the average salary from the employees table, but fails if the average salary is less than $50,000.

```
SELECT AVG (salary) AS average_salary
FROM employees
CONSTRAINT average_salary >= 50000;
```

The following query retrieves the total salary for each department from the employees table, but fails if any department's total salary is below $100,000.

```
SELECT department_id, SUM (salary) AS total_salary
FROM employees
GROUP BY department_id
CONSTRAINT total_salary >= 100000;
```

The following query joins employees and departments tables to list employees who are in the "Engineering" department, but fails if the total number of such employees is less than 10.

```
SELECT e.name, d.department_name
FROM employees e
JOIN departments d ON e.department_id = d.department_id
WHERE d.department_name = '"Engineering"
CONSTRAINT COUNT(e.employee_id) >= 10;
```

The following query updates the salary in the employees table, but fails if no rows are actually updated (e.g., if no employee exists with the given id). In general, transaction rollback may be implemented if a constraint check fails for update, insert, or delete operations.

```
UPDATE employees
SET salary = salary + 5000
WHERE employee_id = 12345
CONSTRAINT ROW_COUNT() > 0;
```

The following query deletes from the employees table where employees have not logged in for over a year, but fails if less than 5 rows are to be deleted.

```
DELETE FROM employees
WHERE last_login < DATE_SUB(CURDATE(), INTERVAL 1 YEAR)
CONSTRAINT ROW_COUNT() >= 5;
```

The following query inserts a new employee into the employees table, but fails if there already exists an employee with the same email.

```
INSERT INTO employees (name, email, salary)
VALUES ("John Doe", "john.doe@example.com", 55000)
```

CONSTRAINT NOT EXISTS (SELECT 1 FROM employees WHERE email = "john.doe@example.com");

Example 7—Example Performance Improvements

Figure 11:
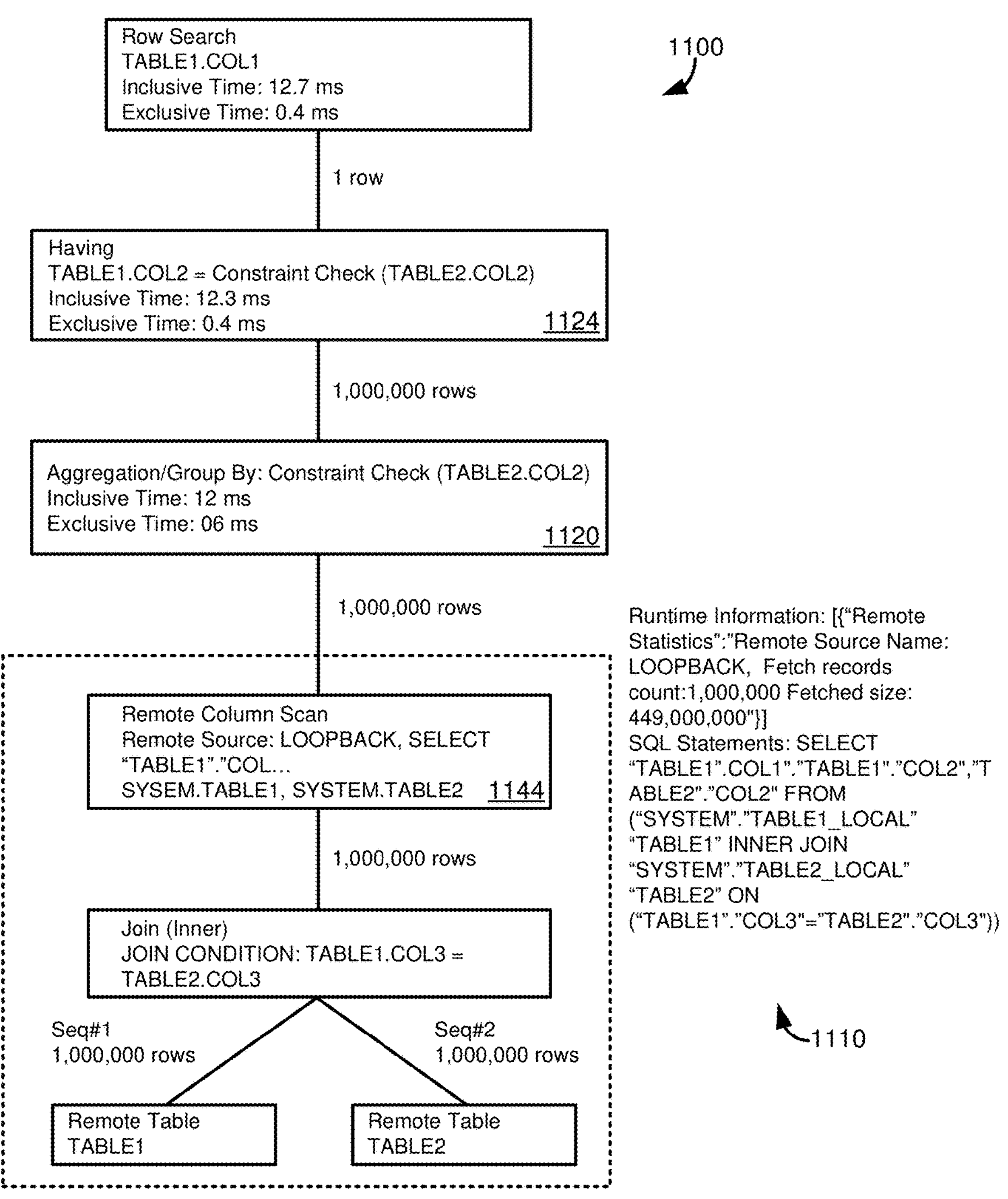
FIG. 11 is a diagram illustrating steps involved in executing the query of FIG. 5, where the constraints are expressed in a query plan and are not in a form that can be sent to a federated system.

FIG. 11 provides a diagram 1100 of operations in executing a SQL statement 1110, where the SQL statement corresponds to a rewritten version, having a join, of a query originally containing a scalar subquery. In this case, the original feature of the scalar subquery failing if multiple values were compared as part of the subquery is preserved through constraints 1120, 1124 placed in the query plan. However, the constraint prevents a larger subplan being sent to the federated system. It can be seen that operation 1144, executed at the federated system results in 1,000,000 being sent to the source system.

Figure 12:
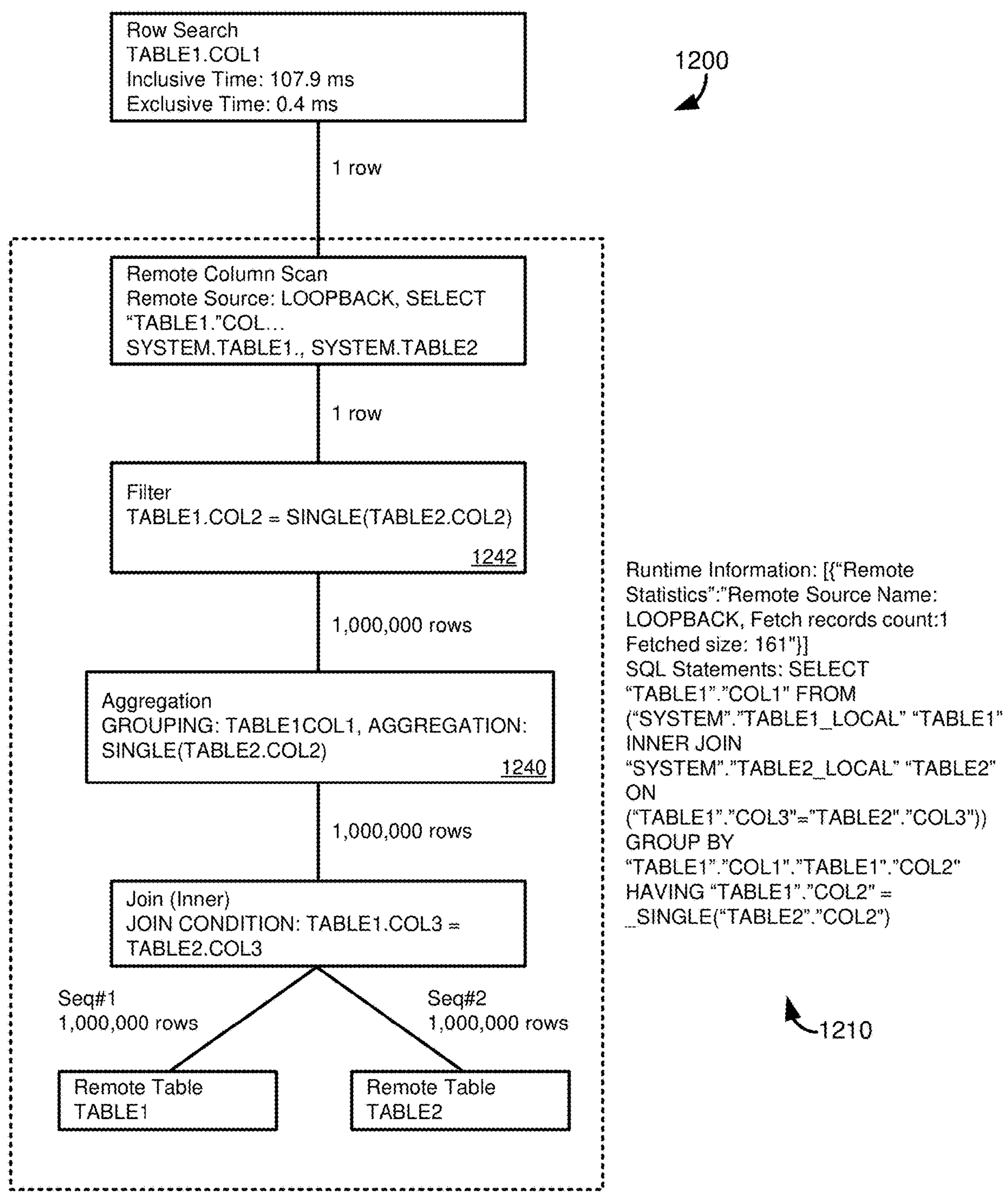
FIG. 12 is a diagram illustrating steps involving in execution the query of FIG. 8, where constraints are in a form that can be sent to a federated system.

FIG. 12 provides a diagram 1200 of operations in executing a SQL statement 1210, where the SQL statement 1210 corresponds to the SQL statement 1110, except that the constraint is expressed in the SQL statement 1210, rather than having the constraint specified in the query plan, but not in the SQL statement 1210 itself.

Since the constraint is expressed in the SQL statement 1210, the join operation and constraint check can be performed at the federated system. Rather than transferring 1,000,000 rows to the source system, results of operations 1240, 1242 result in a single row being returned to the source system, saving significant computing resources.

Example 8—Example Operations Involving Virtual Parameterized Data Objects

FIG. 13A illustrates a process 1300 for rewriting a query to include a constraint. At 1304, a first query is received at a first database system. The first query includes a first plurality of query operations. The first query is rewritten at 1308 to provide a second query. The second query includes one or more query operations that are different than that first plurality of query operations of the first query. A first query operation of the one or more query operations is a keyword in a query language and expresses a constraint. During query execution, the query fails if the constraint is not satisfied.

FIG. 13B is a flowchart of a process 1330 for executing a query at a federated database. At the federated database system, at 1334, a first plurality of query operations are received from a source database system. The first plurality of query operations includes a first query operation that includes a keyword of a query languages and expresses a constraint. During execution of the first plurality of query operations at the federated database system, a query comprising the first query operations fails if the constraint is not satisfied. The constraint is evaluated at 1338. At 1342, execution results from executing at least a portion of the first plurality of query operations are returned to the source database system.

Figure 13C:
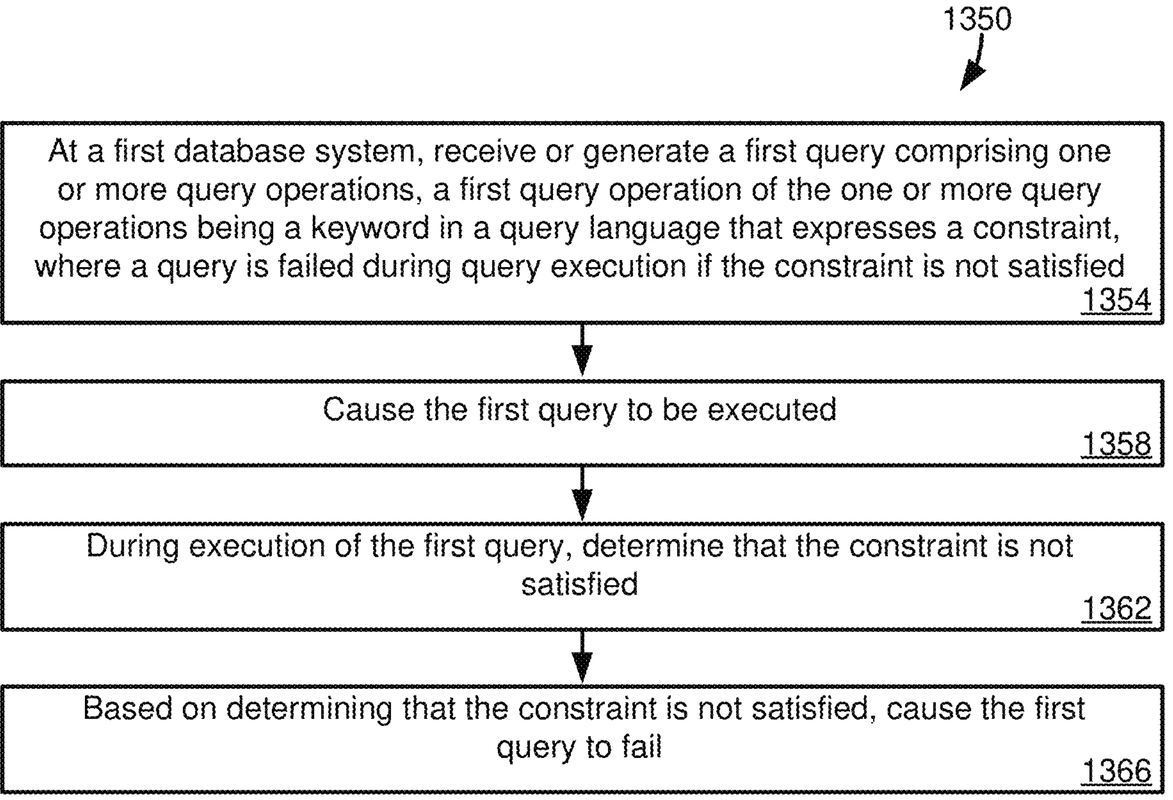
FIG. 13C is a flowchart that illustrates example operations for a process of executing a query that includes a constraint.

FIG. 13C is a flowchart of a process 1350 for executing a query that includes a constraint. A first query is received or generated by a first database system at 1354. The first query includes one or more query operations, with a first query operation being a keyword in a query language that expresses a constraint. If the constraint is not satisfied during query execution, the query fails. The first query is caused to be executed at 1358. At 1362, during execution of the first query it is determined that the constraint is not satisfied. The first query to is caused to fail at 1366 based on this determination.

Example 9—Additional Examples

In Example 1, a computing system is provided that includes at least one memory, one or more hardware processor units coupled to the memory, and one or more computer-readable storage media. These storage media store computer-executable instructions that, when executed, cause the computing system to perform operations. These operations include receiving a first query at a first database system, where the first query includes a first plurality of query operations. The first query is rewritten to provide a second query. The second query includes one or more query operations that are different than that first plurality of query operations of the first query. A first query operation of the one or more query operations is a keyword in a query language and expresses a constraint. During query execution, the query fails if the constraint is not satisfied.

In Example 2, the operations of the computing system from Example 1 are expanded to include sending multiple query operations of the second query to a federated database system. The multiple query operations of the second plurality of query operations include the first query operation.

In Example 3, the operations of the computing system from Example 1 or Example 2 are further expanded to include receiving an indicator from the federated database system that a constraint was not satisfied, and subsequently terminating the query.

In Example 4, the computing system from any of Examples 1-3 is specified such that the first query includes query operations for a scalar subquery, which is rewritten as query operations in the second query comprising a join operation and a grouping operation.

In Example 5, the computing system from Example 4 checks whether only one value is present for each distinct group defined by the grouping operation.

In Example 6, the computing system from any of Examples 1-5 the constraint checks for a particular condition and is usable with multiple types of query operations.

In Example 7, the computing system from any of Examples 1-6, during query execution, determines an implementation of the constraint to use based on a context in the second query for the constraint.

In Example 8, a method is provided that is implemented in a computing system comprising at least one hardware processor and at least one memory coupled to the hardware processor. The method includes receiving, at a federated database system, a first plurality of query operations from a source database system. The first plurality of query operations includes a first query operation that includes a keyword of a query languages and expresses a constraint. During execution of the first plurality of query operations at the federated database system, a query comprising the first query operations fails if the constraint is not satisfied. The constraint is evaluated. Execution results from executing at least a portion of the first plurality of query operations are returned to the source database system.

In Example 9, the method from Example 8 includes a situation where the constraint is not satisfied and the execution result comprises an indicator that the query failed.

In Example 10, the method from Example 8 includes a situation where the constraint is satisfied and the execution results comprise data satisfying conditions of the first plurality of query operations.

In Example 11, the method from any of Examples 8-10 includes a situation where the first plurality of query operations comprise query operations corresponding to a scalar subquery rewritten as query operations comprising a join operation and a grouping operation.

In Example 12, the method from Example 11 includes a situation where evaluating the constraint comprises determining whether only one value is present for each distinct group defined by the grouping operation.

In Example 13, the method from any of Examples 8-12 includes a situation where the constraint checks for a particular condition and is usable with multiple types of query operations.

In Example 14, the method from any of Examples 8-13 includes a situation where, during query execution by a query executor of the federated database system, an implementation of the constraint to use is determined based on a context in the first plurality of query operations for the constraint.

In Example 15, a method is provided that is implemented in a computing system. The method includes receiving or generating a first query at a first database system. The first query comprises one or more query operations, with a first query operation being a keyword in a query language that expresses a constraint. If the constraint is not satisfied during query execution, the query fails. The method also includes causing the first query to be executed, determining during execution of the first query that the constraint is not satisfied, and causing the first query to fail based on this determination.

In Example 16, the method from Example 15 is expanded to include rewriting a second query to provide the first query with the first query operation.

In Example 17, the method from Example 15 or Example 16 is further expanded to include sending at least a portion of the one or more query operations of the first query, including the first query operation, to a second database system for execution.

In Example 18, the method from Example 17 is further expanded to include receiving from the second database system an indicator that the constraint was not satisfied, and subsequently terminating the query.

In Example 19, the method from Example 17 includes a situation where the second query comprises query operations for a scalar subquery, and the scalar subquery is rewritten as query operations in the first query comprising a join operation and a grouping operation.

In Example 20, the method from Example 19 includes a situation where evaluating the constraint comprises determining whether only one value is present for each distinct group defined by the grouping operation.

Example 9—Computing Systems

Figure 14:
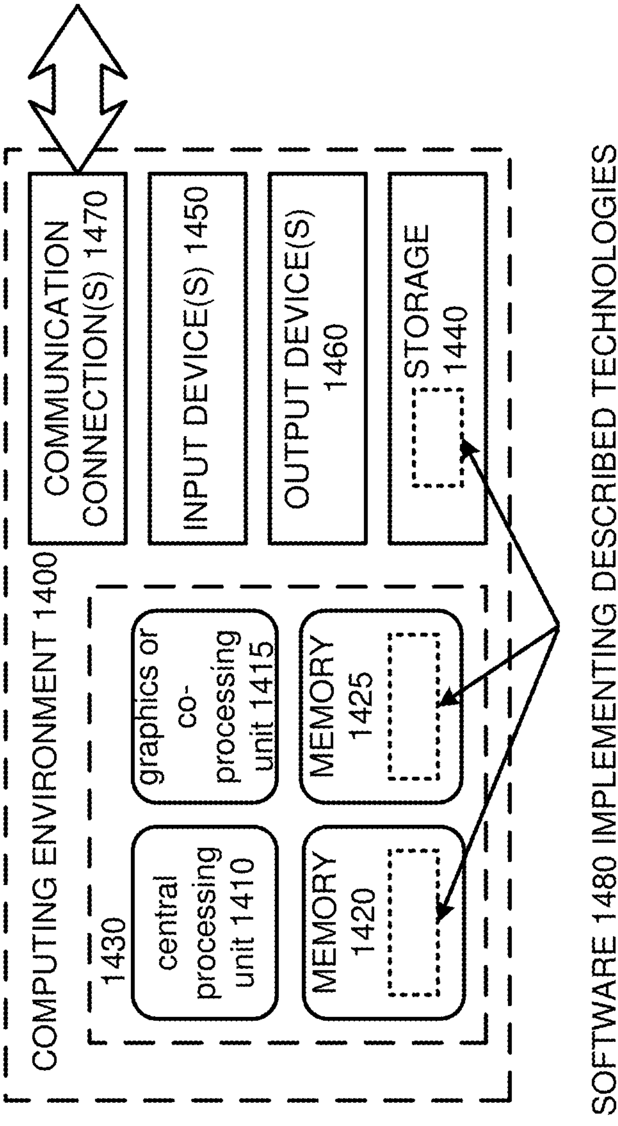
FIG. 14 is a diagram of an example computing system in which some described embodiments can be implemented.

FIG. 14 depicts a generalized example of a suitable computing system 1400 in which the described innovations may be implemented. The computing system 1400 is not intended to suggest any limitation as to scope of use or functionality of the present disclosure, as the innovations may be implemented in diverse general-purpose or special-purpose computing systems.

With reference to FIG. 14, the computing system 1400 includes one or more processing units 1410, 1415 and memory 1420, 1425. In FIG. 14, this basic configuration 1430 is included within a dashed line. The processing units 1410, 1415 execute computer-executable instructions, such as for implementing a database environment, and associated methods, described in Examples 1-8. A processing unit can be a general-purpose central processing unit (CPU), a processor in an application-specific integrated circuit (ASIC), or any other type of processor. In a multi-processing system, multiple processing units execute computer-executable instructions to increase processing power. For example, FIG. 14 shows a central processing unit 1410 as well as a graphics processing unit or co-processing unit 1415. The tangible memory 1420, 1425 may be volatile memory (e.g., registers, cache, RAM), non-volatile memory (e.g., ROM, EEPROM, flash memory, etc.), or some combination of the two, accessible by the processing unit(s) 1410, 1415. The memory 1420, 1425 stores software 1480 implementing one or more innovations described herein, in the form of computer-executable instructions suitable for execution by the processing unit(s) 1410, 1415.

A computing system 1400 may have additional features. For example, the computing system 1400 includes storage 1440, one or more input devices 1450, one or more output devices 1460, and one or more communication connections 1470. An interconnection mechanism (not shown) such as a bus, controller, or network interconnects the components of the computing system 1400. Typically, operating system software (not shown) provides an operating environment for other software executing in the computing system 1400, and coordinates activities of the components of the computing system 1400.

The tangible storage 1440 may be removable or non-removable, and includes magnetic disks, magnetic tapes or cassettes, CD-ROMs, DVDs, or any other medium which can be used to store information in a non-transitory way, and which can be accessed within the computing system 1400. The storage 1440 stores instructions for the software 1480 implementing one or more innovations described herein.

The input device(s) 1450 may be a touch input device such as a keyboard, mouse, pen, or trackball, a voice input device, a scanning device, or another device that provides input to the computing system 1400. The output device(s) 1460 may be a display, printer, speaker, CD-writer, or another device that provides output from the computing system 1400.

The communication connection(s) 1470 enable communication over a communication medium to another computing entity, such as another database server. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 10—Cloud Computing Environment

Figure 15:
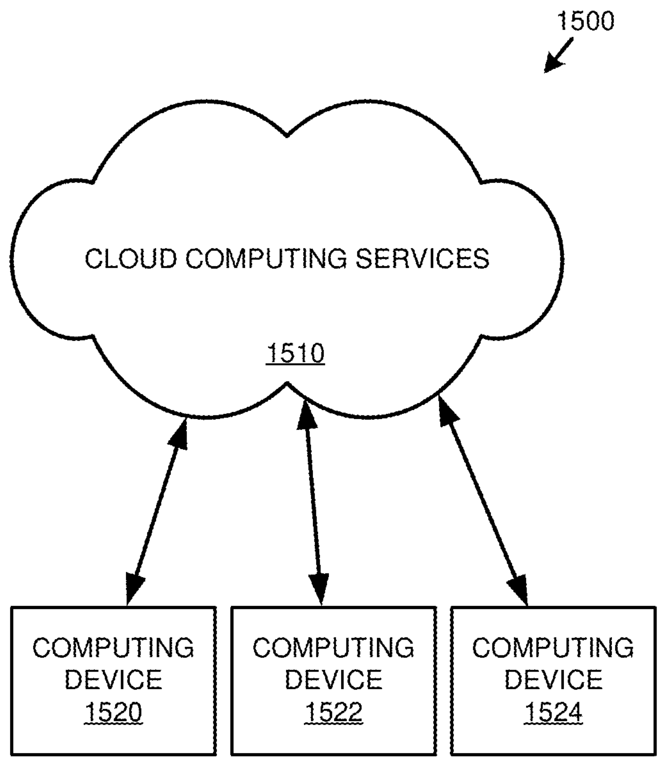
FIG. 15 is an example cloud computing environment that can be used in conjunction with the technologies described herein.

FIG. 15 depicts an example cloud computing environment 1500 in which the described technologies can be implemented. The cloud computing environment 1500 comprises cloud computing services 1510. The cloud computing services 1510 can comprise various types of cloud computing resources, such as computer servers, data storage repositories, networking resources, etc. The cloud computing services 1510 can be centrally located (e.g., provided by a data center of a business or organization) or distributed (e.g., provided by various computing resources located at different locations, such as different data centers and/or located in different cities or countries).

The cloud computing services 1510 are utilized by various types of computing devices (e.g., client computing devices), such as computing devices 1520, 1522, and 1524. For example, the computing devices (e.g., 1520, 1522, and 1524) can be computers (e.g., desktop or laptop computers), mobile devices (e.g., tablet computers or smart phones), or other types of computing devices. For example, the computing devices (e.g., 1520, 1522, and 1524) can utilize the cloud computing services 1510 to perform computing operators (e.g., data processing, data storage, and the like).

Example 11—Implementations

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 14, computer-readable storage media include memory 1420 and 1425, and storage 1440. The term computer-readable storage media does not include signals and carrier waves. In addition, the term computer-readable storage media does not include communication connections (e.g., 1470).

Any of the computer-executable instructions for implementing the disclosed techniques, as well as any data created and used during implementation of the disclosed embodiments, can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, Structured Query Language, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:

at least one memory;

one or more hardware processor units coupled to the at least one memory; and one or more computer readable storage media storing computer-executable instructions that, when executed, cause the computing system to perform operations comprising:

at a first database system, receiving a first query comprising a first query expression, the first query expression comprising a first plurality of query operations specified in a first query language;

rewriting the first query expression to provide a second query expression for a second query, the second query expression comprising a second plurality of query operations specified in a second query language that is the first query language or a different query language, the second plurality of query operations comprising one or more query operations that are different than the first plurality of query operations of the first query expression, a first query operation of the second plurality of query operations being a keyword in the second query language expressing a constraint, where, during query execution of a query plan derived from the second query expression, when the constraint is not satisfied, the second query terminates with an error such that a failure result is generated and no logical answer to the second query is produced;

transmitting the second query, which comprises the keyword in the second query expression, to a second database system for execution, where the second database system generates and executes the query plan derived from the second query expression, and, during execution, determines if the constraint is satisfied, and, in response to determining that the constraint is not satisfied, generates a failure result;

by the first database system, receiving from the second database system (i) a query result for the second query, when the constraint is satisfied; or (ii) the failure result, and no logical answer, when the constraint is not satisfied; and returning, to a requester of the first query, the query result, or another result derived therefrom, or the failure result, or another failure result derived therefrom.

2. The computing system of claim 1, the operations further comprising:

sending to a federated database system multiple query operations of the second plurality of query operations, the multiple query operations of the second plurality of query operations comprising the first query operation.

3. The computing system of claim 2, the operations further comprising:

receiving from the federated database system an indicator that the constraint was not satisfied; and terminating the query.

4. The computing system of claim 1, wherein the first query comprises query operations for a scalar subquery, and the scalar subquery is rewritten as query operations in the second query comprising a join operation and a grouping operation.

5. The computing system of claim 4, wherein the constraint checks whether only one value is present for each distinct group defined by the grouping operation.

6. The computing system of claim 1, wherein the constraint checks for a particular condition and is useable with multiple types of query operations.

7. The computing system of claim 1, wherein, during query execution a query executor determines an implementation of the constraint to use based on a context in the second query for the constraint.

8. A method, implemented in a computing system comprising at least one hardware processor and at least one memory coupled to the at least one hardware processor, the method comprising:

at a federated database system, receiving a first query comprising a first query expression comprising a first plurality of query operations specified in a first query language from a source database system, the first plurality of query operations comprising a first query operation expressing a constraint, the first query operation being a keyword of the first query language, wherein the keyword provides that, during query execution of the first plurality of query operations at the federated database system, when the constraint associated with the keyword is not satisfied, query execution of a query plan generated from the first query expression generates a failure result and no logical answer to the query is produced;

from the first query expression, generating a query plan, the query plan comprising an operation to evaluate the constraint;

executing the query plan;

evaluating the constraint during execution of the query plan; and when the constraint is satisfied, providing an execution result of executing the query plan to the source database system as a result of the first query, or, when the constraint is not satisfied, providing the failure notification to the source database system.

9. The method of claim 8, wherein the constraint is not satisfied and the execution result comprises an indicator that the query failed.

10. The method of claim 8, wherein the constraint is satisfied and the execution results comprises data satisfying conditions of the first plurality of query operations.

11. The method of claim 8, wherein the first plurality of query operations comprise query operations corresponding to a scalar subquery rewritten as query operations comprising a join operation and a grouping operation.

12. The method of claim 11, wherein evaluating the constraint comprises determining whether only one value is present for each distinct group defined by the grouping operation.

13. The method of claim 8, wherein the constraint checks for a particular condition and is useable with multiple types of query operations.

14. The method of claim 8, further comprising:

during query execution by a query executor of the federated database system, determining an implementation of the constraint to use based on a context in the first plurality of query operations for the constraint.

15. One or more computer readable storage media comprising:

computer-executable instructions that, when executed by a computing system comprising at least one hardware processor and at least one memory coupled to the at least one hardware processor, cause the computing system to, at a first database system, receive or generate a first query comprising a first query expression comprising one or more query operations specified in a first query language, a first query operation of the one or more query operations being a keyword in the first query language and expressing a constraint, wherein query execution of a query plan implementing the constraint is terminated if the constraint is not satisfied, and the first query expression returns a failure result and no logical answer to the first query expression is produced;

computer-executable instructions that, when executed by the computing system, cause the computing system to cause a first query plan generated using the first query expression to be executed;

computer-executable instructions that, when executed by the computing system, cause the computing system to, during execution of the first query plan, determine that the constraint is not satisfied; and computer-executable instructions that, when executed by the computing system, cause the computing system to, based on determining that the constraint is not satisfied, cause execution of the first query plan to generate the failure result.

16. The one or more computer readable storage media of claim 15, further comprising:

computer-executable instructions that, when executed by the computing system, cause the computing system to rewrite a second query to provide the first query with the first query operation.

17. The one or more computer readable storage media of claim 16, wherein the second query comprises query operations for a scalar subquery, and the scalar subquery is rewritten as query operations in the first query comprising a join operation and a grouping operation.

18. The one or more computer readable storage media of claim 17, wherein evaluating the constraint comprises determining whether only one value is present for each distinct group defined by the grouping operation.

19. The one or more computer readable storage media of claim 15, further comprising:

computer-executable instructions that, when executed by the computing system, cause the computing system to send at least a portion of the one or more query operations of the first query, including the first query operation, to a second database system for execution.

20. The one or more computer readable storage media of claim 19, further comprising:

computer-executable instructions that, when executed by the computing system, cause the computing system to receive from the second database system an indicator that the constraint was not satisfied; and computer-executable instructions that, when executed by the computing system, cause the computing system to terminate the query.

* * * * *